(12) United States Patent
Okada

(10) Patent No.: US 9,332,213 B2
(45) Date of Patent: May 3, 2016

(54) RECORDING DEVICE AND IMAGING APPARATUS

(71) Applicant: Panasonic Intellectual Property Management Co., Ltd., Osaka (JP)

(72) Inventor: Takanori Okada, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 9 days.

(21) Appl. No.: 14/591,671

(22) Filed: Jan. 7, 2015

(65) Prior Publication Data

US 2015/0244970 A1 Aug. 27, 2015

(30) Foreign Application Priority Data

Feb. 24, 2014 (JP) .................................. 2014-032687
Sep. 1, 2014 (JP) .................................. 2014-176824

(51) Int. Cl.
*H04N 9/80* (2006.01)
*H04N 5/77* (2006.01)
*G11B 20/10* (2006.01)
*H04N 9/804* (2006.01)
*H04N 9/806* (2006.01)

(52) U.S. Cl.
CPC .......... *H04N 5/772* (2013.01); *G11B 20/10527* (2013.01); *H04N 9/806* (2013.01); *H04N 9/8045* (2013.01)

(58) Field of Classification Search
CPC ..... H04N 5/772; H04N 9/8045; H04N 9/806; G11B 20/10527

USPC .................................................. 386/227, 242
See application file for complete search history.

(56) References Cited

U.S. PATENT DOCUMENTS

| 7,336,888 B2 * | 2/2008 | Wu ....................... G11B 27/034 386/326 |
| 2004/0264955 A1 * | 12/2004 | Fujii ....................... G03B 17/04 396/448 |
| 2005/0237398 A1 * | 10/2005 | Fujii ................... H04N 1/00127 348/231.99 |
| 2009/0109350 A1 * | 4/2009 | Koyama ............... H04N 9/3155 348/759 |

FOREIGN PATENT DOCUMENTS

| JP | 2001-203921 | * | 7/2001 |
| JP | 2008-226045 A | | 9/2008 |

* cited by examiner

*Primary Examiner* — Thai Tran
*Assistant Examiner* — Mishawn Hunter
(74) *Attorney, Agent, or Firm* — McDermott Will & Emery LLP

(57) ABSTRACT

A recording device that improves the stability of an operation of recording data in a recording medium is provided. Recording device includes mounting unit, protective cover, open/close detecting unit, buffer, and recording controller. The recording controller performs a control of storing data into the buffer, reading, from the buffer, the data stored in the buffer, and recording the data into the recording medium. When the open/close detecting unit detects that the protective cover is opened, the recording controller performs a control of continuing the operation of storing data into the buffer, and yet stopping the operation of reading, from the buffer, the data stored in the buffer and recording the data into the recording medium.

11 Claims, 15 Drawing Sheets

RECORDING DEVICE AND IMAGING APPARATUS

RELATED APPLICATIONS

This application claims the benefit of Japanese Application No. 2014-032687, filed on Feb. 24, 2014 and Japanese Application No. 2014-176824, filed on Sep. 1, 2014, the disclosures of which Applications are incorporated by reference herein.

BACKGROUND OF THE INVENTION

1. Field of the Invention

The present disclosure relates to a recording device that is detachably mounted with an interchangeable recording medium and records a video signal and an audio signal, and to an imaging apparatus including the recording device.

2. Background Art

A recording device is known that is interchangeably mounted with a recording medium such as a magnetic tape, a magnetic disk, or an optical disk and records a video signal and an audio signal on the recording medium. In such a recording device, a mechanical operation such as winding of the tape or rotation of the disk is executed during a recording operation of a signal, so that whether a signal is being recorded or not can be recognized based on whether such a mechanical operation is being executed or not. Therefore, an accident in which the recording medium is carelessly taken out during a recording operation of a signal can be relatively easily prevented.

While, a recording device is known that is interchangeably mounted with a memory card having a built-in nonvolatile semiconductor memory device such as a flash memory and records a video signal and an audio signal on the memory card.

In such a recording device, the above-mentioned mechanical operation does not occur during a recording operation of a signal onto the memory card, so that whether a signal is being recorded or not is relatively difficult to be recognized. Therefore, there is a risk that the memory card is accidentally taken out of the mounting unit during the recording operation of a signal onto the memory card.

Unexamined Japanese Patent Publication No. 2008-226045 (Patent Literature 1) discloses a memory card recording device. In this memory card recording device, when it is detected that a card protective cover is opened during the recording of data onto the memory card, a warning image for cautioning a user not to remove the memory card is displayed.

SUMMARY OF THE INVENTION

The present disclosure provides a recording device that is detachably mounted with an interchangeable recording medium, and an imaging apparatus including the recording device.

A recording device of the present disclosure includes a mounting unit, a protective cover, an open/close detecting unit, a buffer, and a recording controller. The mounting unit is configured so that a recording medium is detachably mounted on it. The protective cover is disposed openably and closably. The protective cover is configured so that, in the closed state, it covers the recording medium mounted on the mounting unit to shield the recording medium from the outside, and, in the open state, the recording medium mounted on the mounting unit is exposed to the outside. The open/close detecting unit is configured to detect the open/closed state of the protective cover. The buffer is configured to temporarily store the data to be recorded in the recording medium mounted on the mounting unit. The recording controller is configured to perform a control of storing the data into the buffer, reading, from the buffer, the data stored in the buffer, and recording it into the recording medium mounted on the mounting unit. The recording controller is also configured to, when the open/close detecting unit detects that the protective cover is opened, perform a control of continuing the operation of storing the data into the buffer, and yet stopping the operation of reading, from the buffer, the data stored in the buffer and recording the data into the recording medium.

An imaging apparatus of the present disclosure includes an imaging unit, and a recording device for storing, in a recording medium, data based on a video signal taken with the imaging unit. The recording device includes a mounting unit, a protective cover, an open/close detecting unit, a buffer, and a recording controller. The mounting unit is configured so that the recording medium is detachably mounted on it. The protective cover is disposed openably and closably. The protective cover is configured so that, in the closed state, it covers the recording medium mounted on the mounting unit to shield the recording medium from the outside, and, in the open state, the recording medium mounted on the mounting unit is exposed to the outside. The open/close detecting unit is configured to detect the open/closed state of the protective cover. The buffer is configured to temporarily store the data to be recorded in the recording medium mounted on the mounting unit. The recording controller is configured to perform a control of storing the data into the buffer, reading, from the buffer, the data stored in the buffer, and recording it into the recording medium mounted on the mounting unit. The recording controller is also configured to, when the open/close detecting unit detects that the protective cover is opened, perform a control of continuing the operation of storing the data into the buffer, and yet stopping the operation of reading, from the buffer, the data stored in the buffer and recording the data into the recording medium.

The recording device of the present disclosure is useful for improving the stability of an operation of recording data in a recording medium.

DETAILED DESCRIPTION OF THE INVENTION

Hereinafter, the exemplary embodiments will be described in detail appropriately with reference to the accompanying drawings. Description more detailed than necessary is sometimes omitted. For example, a detailed description of a well-known item and a repeated description of substantially the same configuration are sometimes omitted. This is for the purpose of preventing the following descriptions from becoming more redundant than necessary and allowing persons skilled in the art to easily recognize the exemplary embodiments.

The accompanying drawings and the following descriptions are provided to allow the persons skilled in the art to sufficiently recognize the present disclosure. It is not intended that they restrict the main subject described within the scope of the claims.

First Exemplary Embodiment

The first exemplary embodiment is hereinafter described using FIG. 1 to FIG. 13. In the present exemplary embodiment, imaging apparatuses 10 and 20, which are professional-use video cameras, are taken as an example of the imaging apparatus including the recording device of the present disclosure. However, an apparatus to which the recording device of the present disclosure is applicable is not limited to the professional-use video cameras. The recording device of the present disclosure is applicable to an apparatus that is detachably mounted with an interchangeable recording medium and records a video signal and an audio signal. The apparatus is, for example, an apparatus of taking a still image having a function of taking a moving image, or a consumer video camera, or an audio recorder.

In the present exemplary embodiment, as an example of the interchangeable recording medium, a memory card having a built-in nonvolatile semiconductor memory device is taken. However, the recording medium is not limited to the memory card, but may simply be an attachable/detachable recording medium.

[1-1. Configuration]

Figure 1:
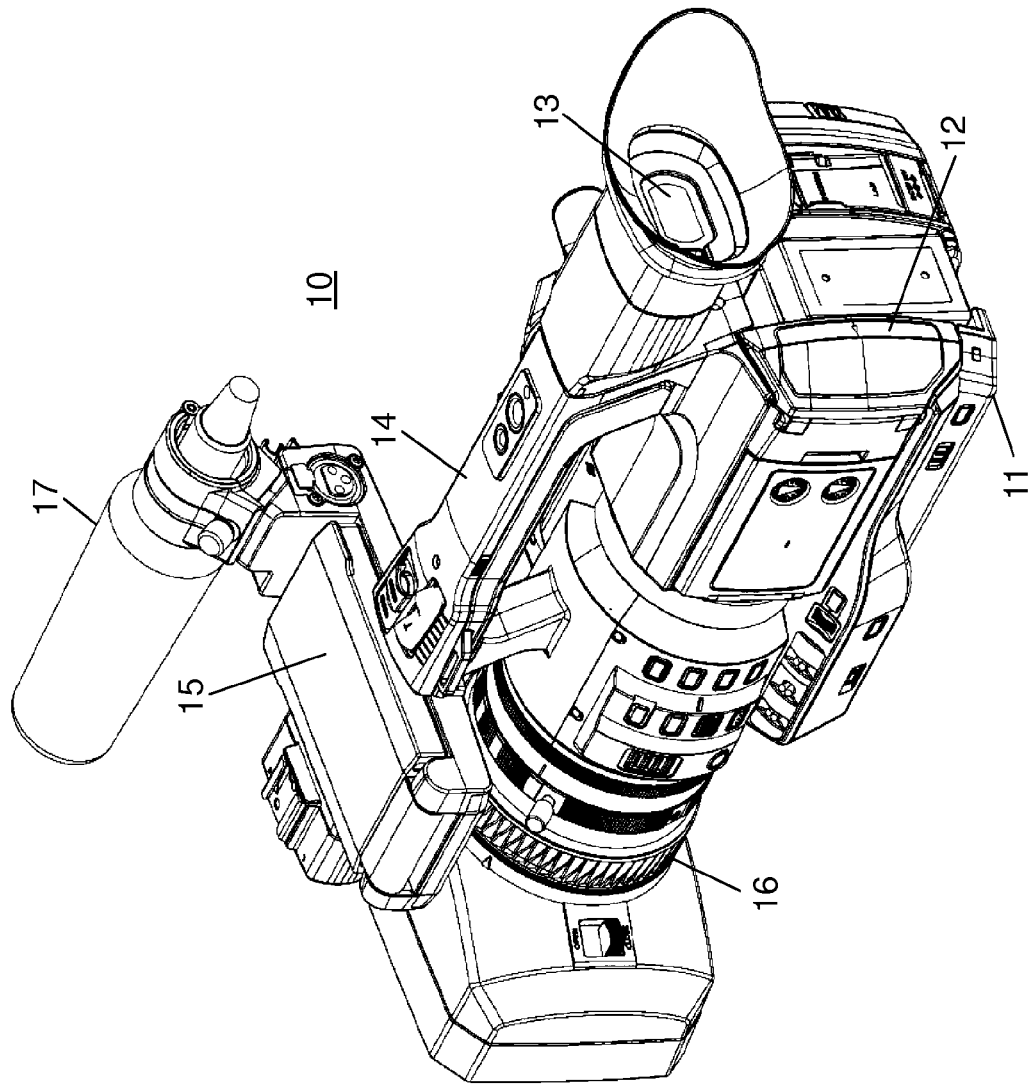
FIG. 1 is a perspective view showing one example of an imaging apparatus including a recording device in accordance with a first exemplary embodiment.
Figure 2:
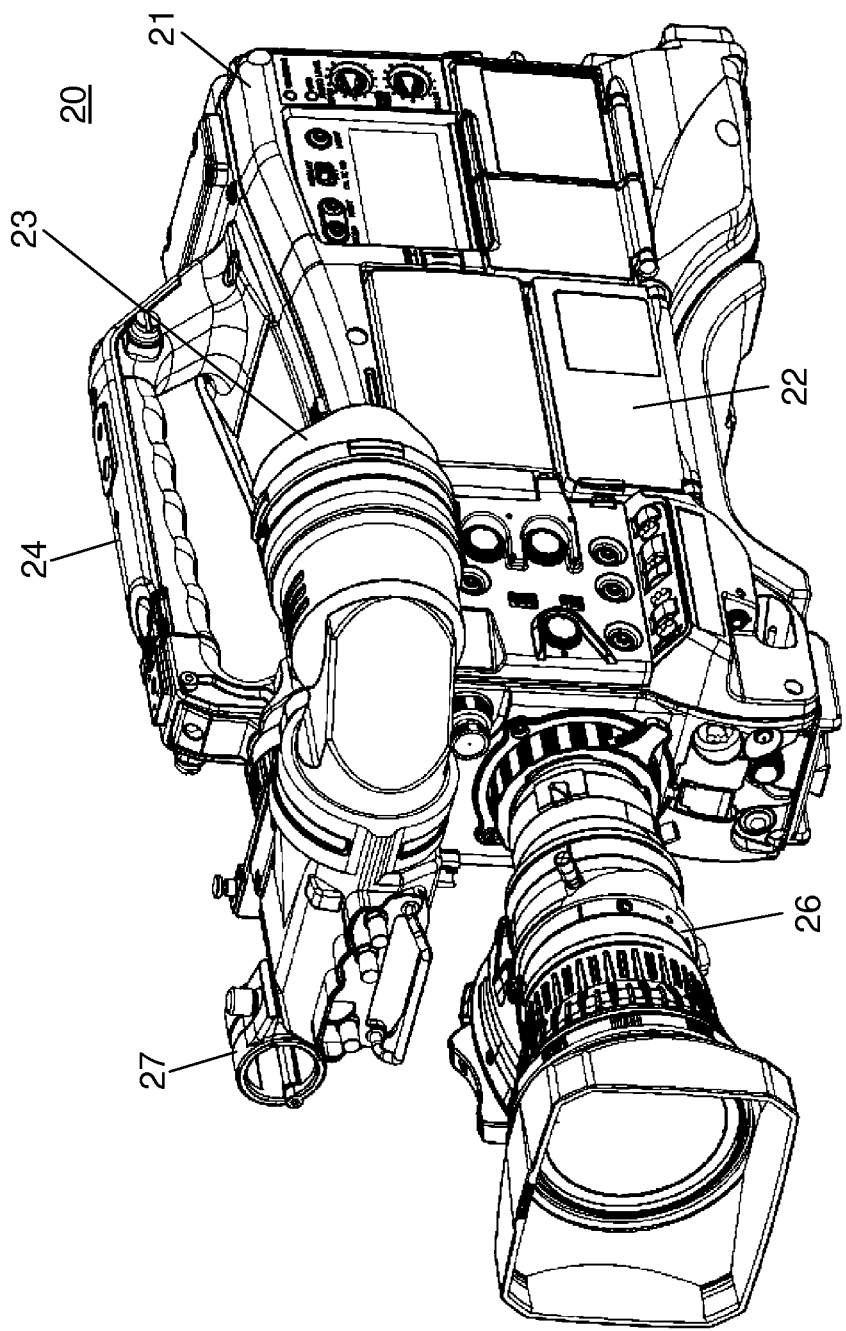
FIG. 2 is a perspective view showing another example of the imaging apparatus including the recording device in accordance with the first exemplary embodiment.

A schematic configuration of an imaging apparatus including a recording device of the present exemplary embodiment is described using FIG. 1 and FIG. 2.

FIG. 1 is a perspective view showing one example of an imaging apparatus including a recording device in accordance with the first exemplary embodiment.

Imaging apparatus 10 of FIG. 1 includes imaging main body 11. Imaging main body 11 includes the following elements:
- a camera unit for taking a moving image of a subject;
- microphone 17 for recording an audio;
- a display unit (view finder 13 and liquid crystal panel 15) for displaying the taken video image; and
- a recording/reproducing unit for recording and reproducing a video signal output from the camera unit and an audio signal output from microphone 17. The units are generally included in a video camera, and hence the description of them using a reference mark is omitted.

Imaging main body 11 includes the following elements:
an imaging unit (not shown in FIG. 1) and imaging lens unit 16 included in the camera unit;
view finder 13 and liquid crystal panel 15 included in the display unit;
a recording device (not shown in FIG. 1) included in the recording/reproducing unit; and
protective cover 12.

In an upper part of imaging main body 11, handle 14 serving as a grip when a user uses or carries imaging apparatus 10 is disposed.

In front of handle 14, liquid crystal panel 15 configured to display taken video image or reproduced video image is attached openably and closably.

When liquid crystal panel 15 is closed, it is stored in a panel storage unit (not shown) to hide the display screen. When liquid crystal panel 15 is opened, it rises from the panel storage unit to expose the display screen. FIG. 1 shows the closed state of liquid crystal panel 15.

View finder 13 is disposed in a rear part of imaging main body 11. Video image taken through imaging lens unit 16 and reproduced video image of the video signal recorded in the recording/reproducing unit are displayed on liquid crystal panel 15 or view finder 13. The user can visually recognize the taken video image or reproduced video image by watching the displayed video image.

A warning image (described later) is displayed on liquid crystal panel 15 or view finder 13.

Protective cover 12 protects a recording medium that is detachably mounted on the recording device included in imaging apparatus 10.

Protective cover 12 may be configured to be lockable, for example, in order to prevent an accidental opening of protective cover 12. However, preferably, in a professional-use video camera or the like, protective cover 12 is configured to be easily opened to allow a rapid interchange of the recording medium. However, protective cover 12 having such a configuration is at a relatively increased risk of accidentally being opened. Protective cover 12 is described later.

FIG. 2 is a perspective view showing another example of the imaging apparatus including the recording device in accordance with the first exemplary embodiment.

Imaging apparatus 20 of FIG. 2 is configured so that a user can operate it on user's shoulder, and includes imaging main body 21. Imaging main body 21 includes imaging lens unit 26, view finder 23, handle 24, and protective cover 22. Imaging lens unit 26 corresponds to imaging lens unit 16 of FIG. 1, view finder 23 corresponds to view finder 13 of FIG. 1, and handle 24 corresponds to handle 14 of FIG. 1, so that repeated description is omitted. Protective cover 22 corresponds to protective cover 12 of FIG. 1. A microphone corresponding to microphone 17 of FIG. 1 can be detachably mounted on microphone mounting unit 27. FIG. 2 shows the state where the microphone is not mounted.

Next, the protective cover included in the recording device of the present exemplary embodiment is described.

Figure 3B:
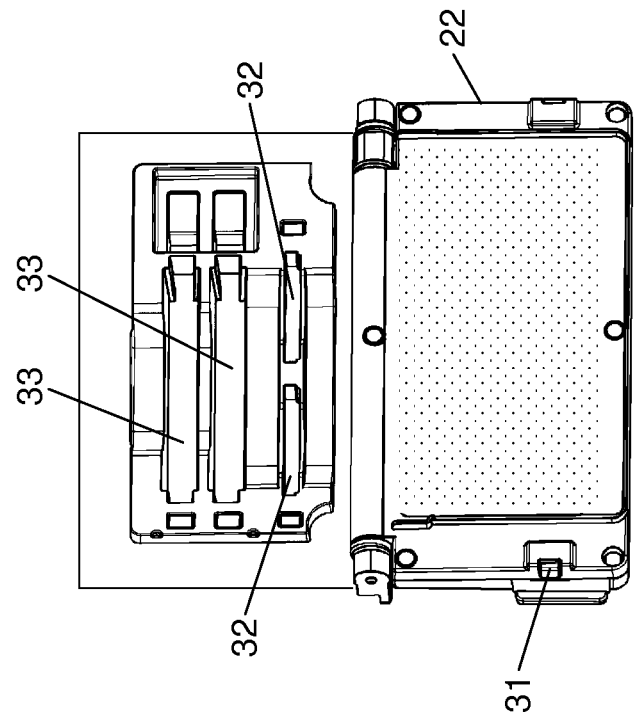
FIG. 3B is a diagram schematically showing an open state of the protective cover included in the recording device in accordance with the first exemplary embodiment.
Figure 3A:
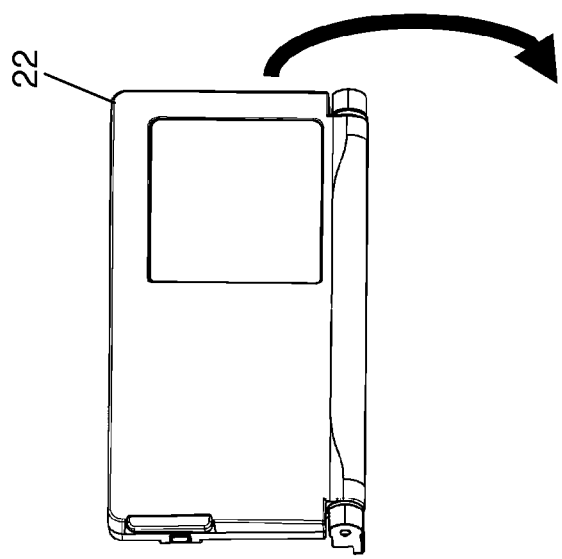
FIG. 3A is a diagram schematically showing a closed state of a protective cover included in the recording device in accordance with the first exemplary embodiment.

FIG. 3A is a diagram schematically showing the closed state of the protective cover included in the recording device in accordance with the first exemplary embodiment. FIG. 3B is a diagram schematically showing the open state of the protective cover included in the recording device in accordance with the first exemplary embodiment.

In FIG. 3A and FIG. 3B, protective cover 22 included in imaging apparatus 20 of FIG. 2 is shown as an example. However, protective cover 12 included in imaging apparatus 10 of FIG. 1 also has substantially the same configuration as that of protective cover 22 of FIG. 3A and FIG. 3B, and performs substantially the same operation.

In the present exemplary embodiment, the protective cover included in the recording device is attached to the recording device openably and closably. This protective cover is disposed in order to prevent a hand of the user or an object from unintendedly touching the recording medium (for example, memory card) detachably mounted on the recording device, or prevent the user from accidentally taking out the recording medium (hereinafter referred to also as "unnecessary physical contact").

FIG. 3B shows the example where a total of four recording media, namely two recording media 32 and two recording media 33 having a shape different from that of recording media 32, are mounted on the recording device included in imaging apparatus 20. Protective cover 22 can protect recording media 32 and 33 from an external unnecessary physical contact. For example, as shown in FIG. 3A, in the closed state of protective cover 22 (hereinafter referred to also as "closed state"), recording media 32 and 33 are protected by protective cover 22 and cannot be touched from the outside. Therefore, an accident in which a hand of the user or an object unintendedly touches recording media 32 and 33 can be prevented.

When recording media 32 and 33 are replaced with new recording media, protective cover 22 is kept open (hereinafter referred to also as "open state") as shown in FIG. 3B, for example. Thus, recording media 32 and 33 are exposed to the outside, and can be taken out of the recording device.

Open/close detecting element 31 is attached on protective cover 22, and open/close detecting element 31 is configured to output a detection signal that indicates a high level (Hi) when protective cover 22 is open or indicates a low level (Lo) when protective cover 22 is closed. An open/close detecting unit (described later) can detect via open/close detecting element 31 whether protective cover 22 is opened or closed.

The protective cover included in the recording device is required simply to protect the recording media from an external unnecessary physical contact. As shown as respective examples in FIG. 1 and FIG. 2, the shape and layout are not limited.

Next, the configuration of the imaging apparatus including the recording device of the present exemplary embodiment is described.

Figure 4:
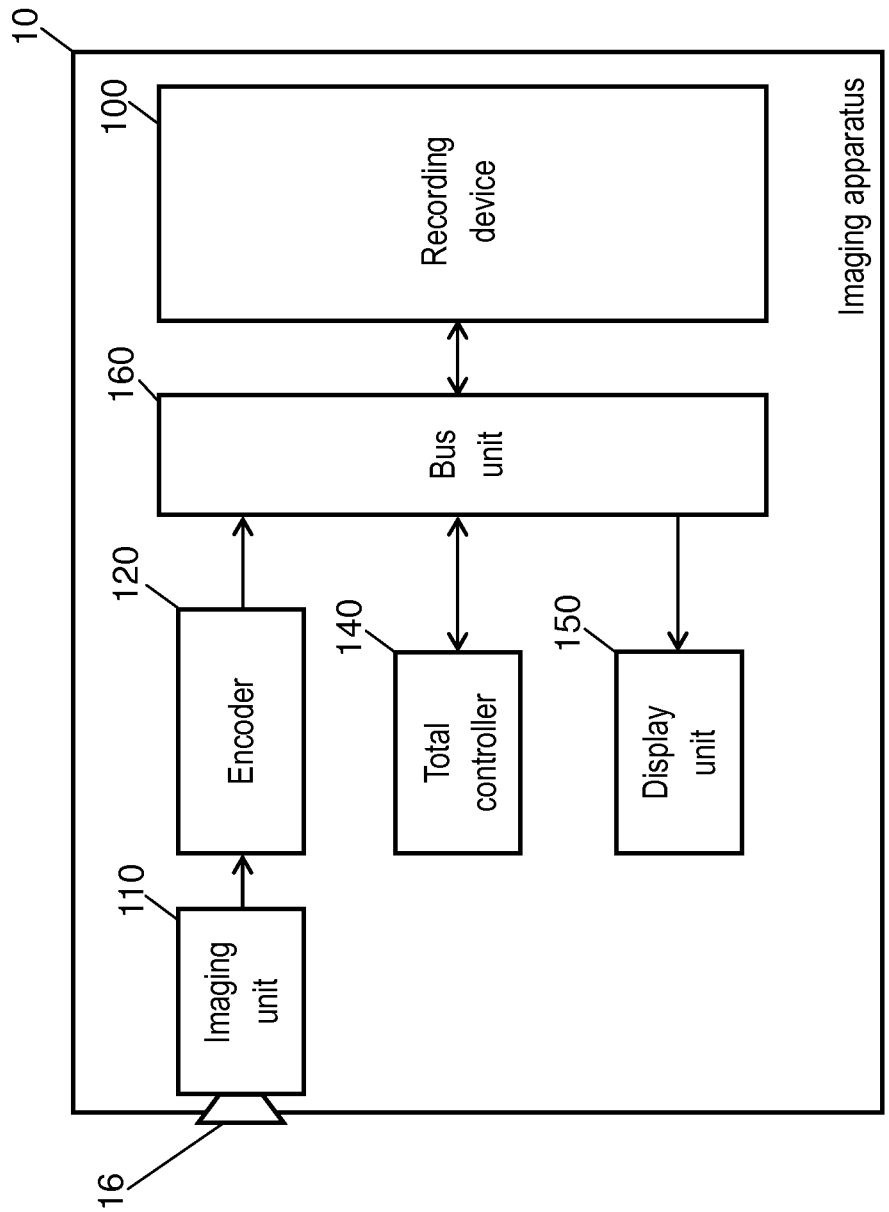
FIG. 4 is a block diagram schematically showing one example of the configuration of the imaging apparatus including the recording device in accordance with the first exemplary embodiment.

FIG. 4 is a block diagram schematically showing one example of the configuration of the imaging apparatus including the recording device in accordance with the first exemplary embodiment. FIG. 4 shows the configuration of imaging apparatus 10 of FIG. 1 as an example, but imaging apparatus 20 of FIG. 2 also has substantially the same configuration as that shown in FIG. 4.

The block diagrams shown in FIG. 4 and its subsequent drawings illustrate main blocks related to the operations of the present exemplary embodiment, and omit the functions and blocks related to the other operations. For example, a power supply or the like is omitted. This is for the purpose of intelligibly describing the operations of the present exemplary embodiment. The blocks illustrated in the diagrams shown in FIG. 4 and its subsequent drawings may be formed of independent circuits, respectively. Alternatively, the blocks may have a configuration where a processor executes a program that is created so as to achieve one or more operations of the blocks shown in the drawing.

As shown in FIG. 4, imaging apparatus 10 includes imaging unit 110, encoder 120, total controller 140, display unit 150, bus unit 160, and recording device 100.

Imaging unit 110 includes imaging lens unit 16 and an imaging element (not shown). The imaging element is a light receiving element, such as a complementary metal-oxide semiconductor (CMOS) or charge coupled device (CCD), and has a function of converting light into an electric signal. Imaging unit 110 is configured so that external light taken through imaging lens unit 16 is formed as an image on the imaging element and the formed image is converted into an electric signal (video signal) and is output. Imaging unit 110 can take a moving image at a rate of 60 frames/sec by repeatedly performing, every 1/60 sec, an operation of converting one image (one frame) formed on the imaging element into a video signal and outputting the video signal, for example. The video signal output from imaging unit 110 is input to encoder 120.

Encoder 120 is configured to compress, by a predetermined signal compression method (e.g. motion picture experts group (MPEG)), the video signal output from imaging unit 110 and the audio signal output from microphone 17 shown in FIG. 1, and configured to output the compressed signals. In other words, encoder 120 compresses the video signal to video data and compresses the audio signal to audio data, and outputs them. The compression method is not limited to the MPEG, but may be another method.

Hereinafter, the video data and the audio data are simply referred to also as "data".

Display unit 150 includes liquid crystal panel 15 and view finder 13 shown in FIG. 1. Display unit 150 is configured to display the video image taken with imaging unit 110 or the reproduced video image. The user can visually recognize the taken video image or reproduced video image by watching the video image displayed on display unit 150. A warning image (described later) is displayed on display unit 150.

Recording device 100 is configured so that an interchangeable recording medium can be detachably mounted on the recording device and the video data and the audio data output from encoder 120 are recorded in the recording medium. Details of recording device 100 are described later.

Bus unit 160 is configured to mediate the data exchange between blocks. In other words, the blocks exchange data with each other via bus unit 160. Therefore, the video data and the audio data that are output from encoder 120 are sent to recording device 100 via bus unit 160, and recorded in the recording medium mounted on recording device 100.

Total controller 140 is configured to appropriately control each block of imaging apparatus 10 in response to the operation state of imaging apparatus 10. For example, when a moving image is taken in imaging apparatus 10, total controller 140 controls each block so that the taking of a moving image is appropriately performed with imaging unit 110 and data created from the taken moving image is appropriately recorded in the recording medium of recording device 100. When video image is reproduced in imaging apparatus 10, total controller 140 controls the blocks so that the video data recorded in the recording medium of recording device 100 is appropriately read and converted into a video signal, and the video signal is appropriately displayed on display unit 150. Total controller 140 controls the blocks (details are described later) so that the blocks satisfy the following conditions:

when recording device 100 commands display of a warning image, the warning image is appropriately displayed on display unit 150 in response to the command; and when recording device 100 commands non-display of a warning image, the warning image is not displayed in response to the command.

Next, the configuration of recording device 100 of the present exemplary embodiment is described.

Figure 5:
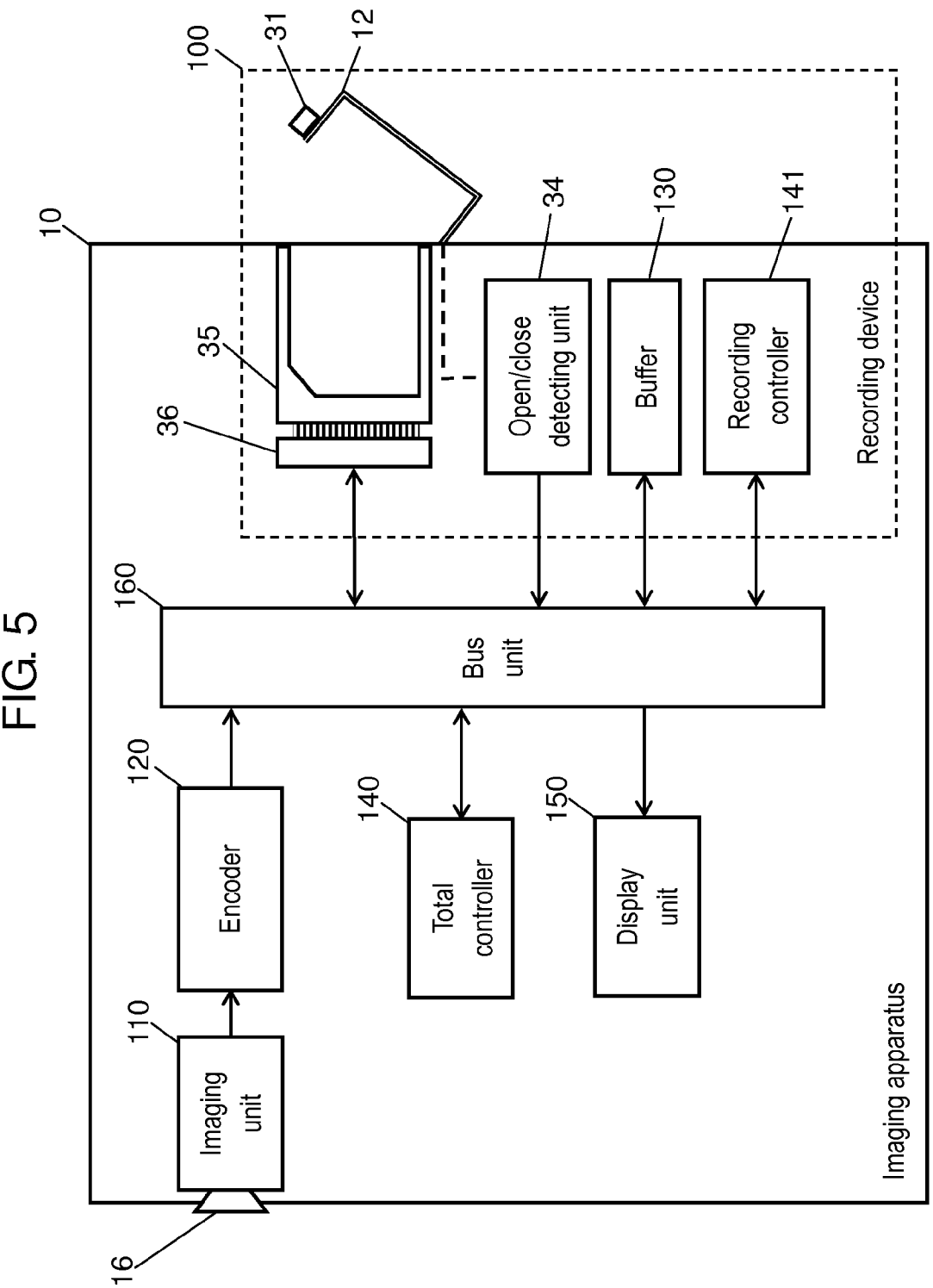
FIG. 5 is a block diagram schematically showing one example of the configuration of the recording device in accordance with the first exemplary embodiment.
Figure 6:
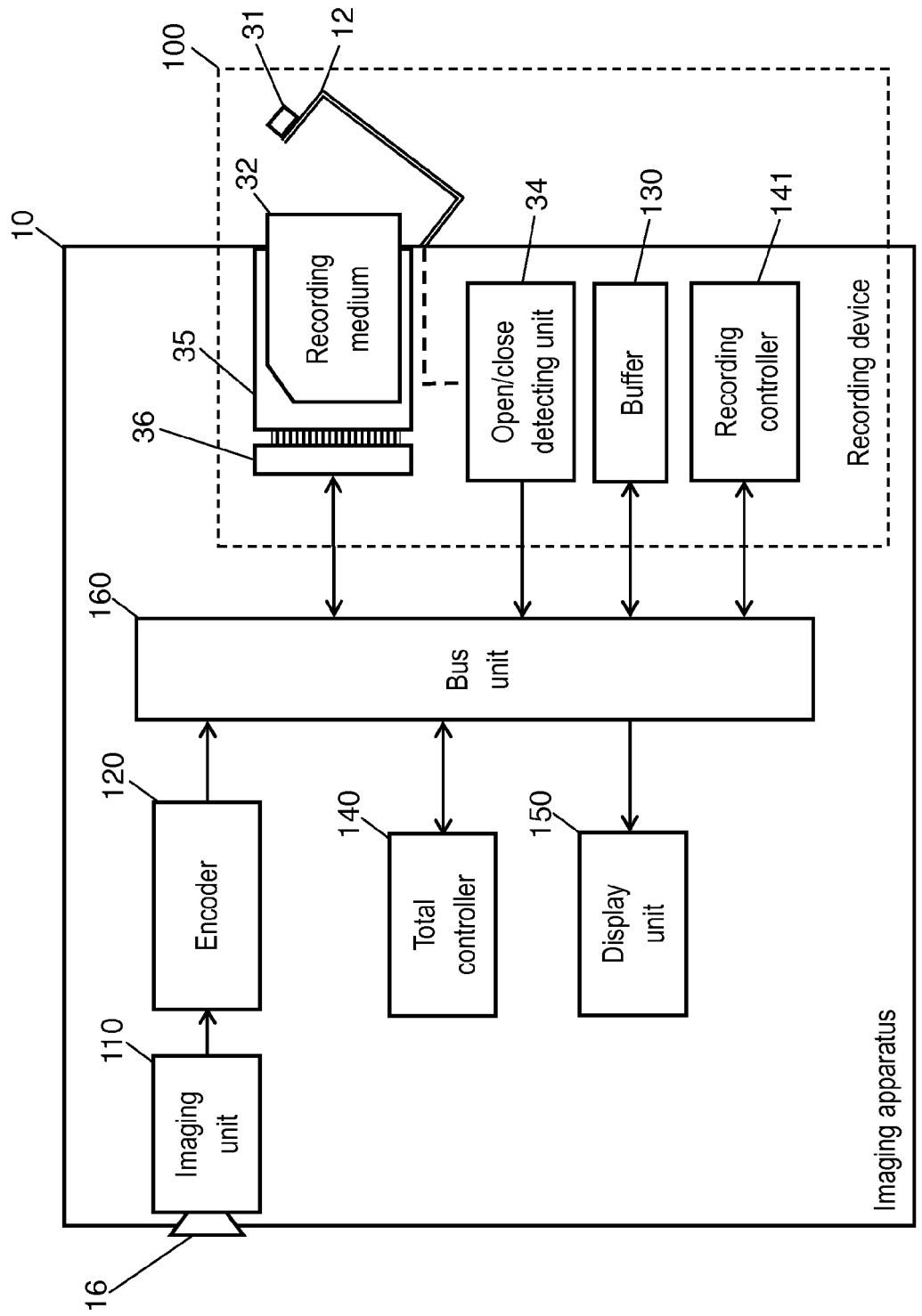
FIG. 6 is a block diagram schematically showing one example of the configuration of the recording device in accordance with the first exemplary embodiment.

FIG. 5 and FIG. 6 are block diagrams schematically showing one example of the configuration of the recording device in accordance with the first exemplary embodiment. FIG. 5 shows recording device 100 on which a recording medium is not mounted, and FIG. 6 shows recording device 100 on which a recording medium is mounted.

FIG. 5 and FIG. 6 show, as an example, the configuration of recording device 100 included in imaging apparatus 10 of FIG. 1. However, the recording device included in imaging apparatus 20 of FIG. 2 also has substantially the same configuration as that shown in FIG. 5 and FIG. 6.

As shown in FIG. 5 and FIG. 6, recording device 100 of the present exemplary embodiment includes mounting unit 35, interface 36, protective cover 12, open/close detecting element 31, open/close detecting unit 34, buffer 130, and recording controller 141.

The blocks included in recording device 100 are configured to exchange data with each other via bus unit 160.

Mounting unit 35 is configured so that interchangeable recording medium 32 can be detachably mounted on mounting unit 35 as shown in FIG. 5 and FIG. 6. Recording medium 32 is a memory card having a built-in nonvolatile semiconductor memory device, for example. Recording medium 32 includes connection terminals (not shown) that are electrically connected to the semiconductor memory device inside it. Mounting unit 35 also includes an electric connection unit (not shown), and the connection terminals of recording medium 32 mounted on mounting unit 35 are electrically connected to the connection terminal of mounting unit 35.

Interface 36 is electrically connected to the connection terminal of mounting unit 35, and is configured to electrically mediate between recording medium 32 mounted on mounting unit 35 and bus unit 160. In other words, data exchange between recording medium 32 mounted on mounting unit 35 and bus unit 160 is performed via interface 36. Interface 36 can recognize whether recording medium 32 is mounted on mounting unit 35 or not on the basis of whether interface 36 can exchange data with recording medium 32 or not. Thus, interface 36 serves also as a recording medium detecting unit. Recording controller 141 can recognize via interface 36 whether recording medium 32 is mounted on mounting unit 35 or not.

Buffer 130 is configured to mediate between encoder 120 and recording medium 32. Encoder 120 outputs data at a rate corresponding to the signal quantity of a moving image output from imaging unit 110. This rate means the data amount handled per unit time (e.g. 1 sec). Preferably, into recording medium 32, data is recorded at an appropriate rate and data size corresponding to the specification of recording medium 32. Therefore, buffer 130 is interposed between encoder 120 and recording medium 32, and serves as a temporal data storage unit for adjusting the transfer rate and data size of the data that is transferred from encoder 120 to recording medium 32. In other words, the data output from encoder 120 is temporally stored in buffer 130, is read from buffer 130 at the rate and data size appropriate for recording of it into recording medium 32, and is recorded into recording medium 32.

In the present exemplary embodiment, when protective cover 12 is opened during the taking of a moving image in imaging apparatus 10, the data output from encoder 120 is continuously stored in buffer 130, but is not transferred from buffer 130 to recording medium 32. Details of this operation are described later.

Protective cover 12 is attached on recording device 100 openably and closably. When protective cover 12 is closed, recording medium 32 mounted on mounting unit 35 is protected from an external physical contact. When protective cover 12 is opened, recording medium 32 mounted on mounting unit 35 is exposed to the outside. Thus, for example, recording medium 32 can be removed from mounting unit 35 and replaced with new recording medium 32.

The reason why recording medium 32 mounted on mounting unit 35 is protected by protective cover 12 is described below.

The connection terminal of recording medium 32 mounted on mounting unit 35 is in contact with the connection terminal of mounting unit 35, and hence is electrically connected to it. When an external force is applied to recording medium 32 by contact or the like, however, a slight clearance occurs between the connection terminal of recording medium 32 and the connection terminal of mounting unit 35, and a phenomenon (chattering) where the electrical connection is temporarily interrupted can occur. If the chattering occurs during a recording operation into recording medium 32, data cannot be correctly recorded into recording medium 32. Protective cover 12 covers recording medium 32 to prevent such a situation from occurring.

Open/close detecting element 31 is attached on protective cover 12, and is configured to output a detection signal that indicates Hi when protective cover 12 is open and indicates Lo when it is closed, for example.

Open/close detecting unit 34 is electrically connected to open/close detecting element 31, and is configured to detect whether protective cover 12 is opened or closed based on the detection signal output from open/close detecting element 31. The detection result of open/close detecting unit 34 is output to recording controller 141.

Open/close detecting element 31 and open/close detecting unit 34 may be formed as one integrated member (not shown). Alternatively, the detection result output from open/close detecting element 31 may be directly input to recording controller 141.

Recording controller 141 is configured to operate in cooperation with total controller 140 and appropriately control the blocks of recording device 100 in response to the operation states of recording device 100 and imaging apparatus 10. For example, when a moving image is taken in imaging apparatus 10, recording controller 141 controls the blocks of recording device 100 in cooperation with total controller 140 so that the data continuously output from encoder 120 by the taking of a moving image is appropriately recorded in recording medium 32 mounted on mounting unit 35. At this time, recording controller 141 appropriately controls the data writing into buffer 130 and data reading from buffer 130, and adjusts the transfer rate and data size of the data that is transferred from encoder 120 to recording medium 32. When video image is reproduced in imaging apparatus 10, recording controller 141 controls the blocks of recording device 100 in cooperation with total controller 140 so that data can be appropriately read from recording medium 32 mounted on mounting unit 35.

In the present exemplary embodiment, when open/close detecting unit 34 detects the open state of protective cover 12 during the taking of a moving image in imaging apparatus 10, recording controller 141 controls the blocks of recording device 100 so that the data output from encoder 120 is continuously stored in buffer 130 and the operation of reading data from buffer 130 and recording it into recording medium 32 is temporarily suspended. Furthermore, recording controller 141 commands total controller 140 to display a warning image on display unit 150. Details of these operations are described later.

In FIG. 5 and FIG. 6, total controller 140 and recording controller 141 are described as separate blocks. However, imaging apparatus 10 may be configured so that total controller 140 and recording controller 141 are integrated and serve as one control unit.

[1-2. Operation]

A data recording operation of recording device 100 having the above-mentioned configuration when a moving image is taken in imaging apparatus 10 is described.

Figure 7:
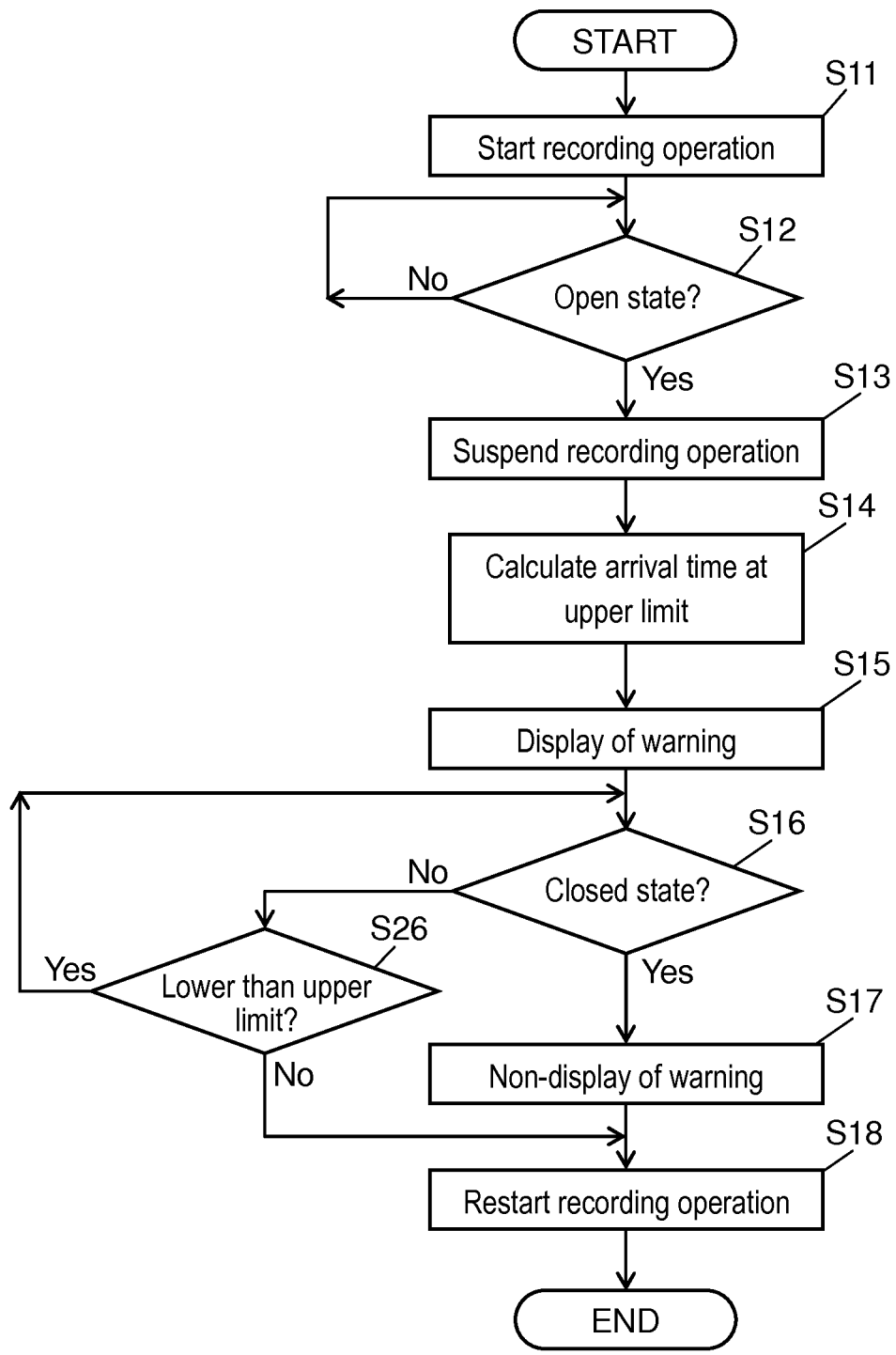
FIG. 7 is a flowchart schematically showing a data recording operation of the recording device in accordance with the first exemplary embodiment.

FIG. 7 is a flowchart schematically showing the data recording operation of recording device 100 in accordance with the first exemplary embodiment.

In the present exemplary embodiment, each operation of recording device 100 in FIG. 7 is set to be controlled by recording controller 141. Recording medium 32 is a recording medium (for example, memory card) mounted on mounting unit 35.

When the taking of a moving image is started in imaging apparatus 10, recording controller 141 starts a data recording operation into recording medium 32 in order to record the data continuously output from encoder 120 (step S11).

Recording controller 141 monitors whether protective cover 12 is opened or closed via open/close detecting unit 34 (step S12). For example, when a Hi level signal is output from open/close detecting unit 34, recording controller 141 determines that protective cover 12 is open. When a Lo level signal is output from open/close detecting unit 34, recording controller 141 determines that protective cover 12 is closed. The Hi and Lo levels of the signal output from open/close detecting unit 34 may indicate the states inverted to the above description.

When protective cover 12 is determined to be closed (No) in step S12, recording controller 141 continuously performs the operation of step S11. The data recording operation at this time is a normal operation of recording device 100.

The outline of the normal operation is described with reference to a drawing.

Figure 8:
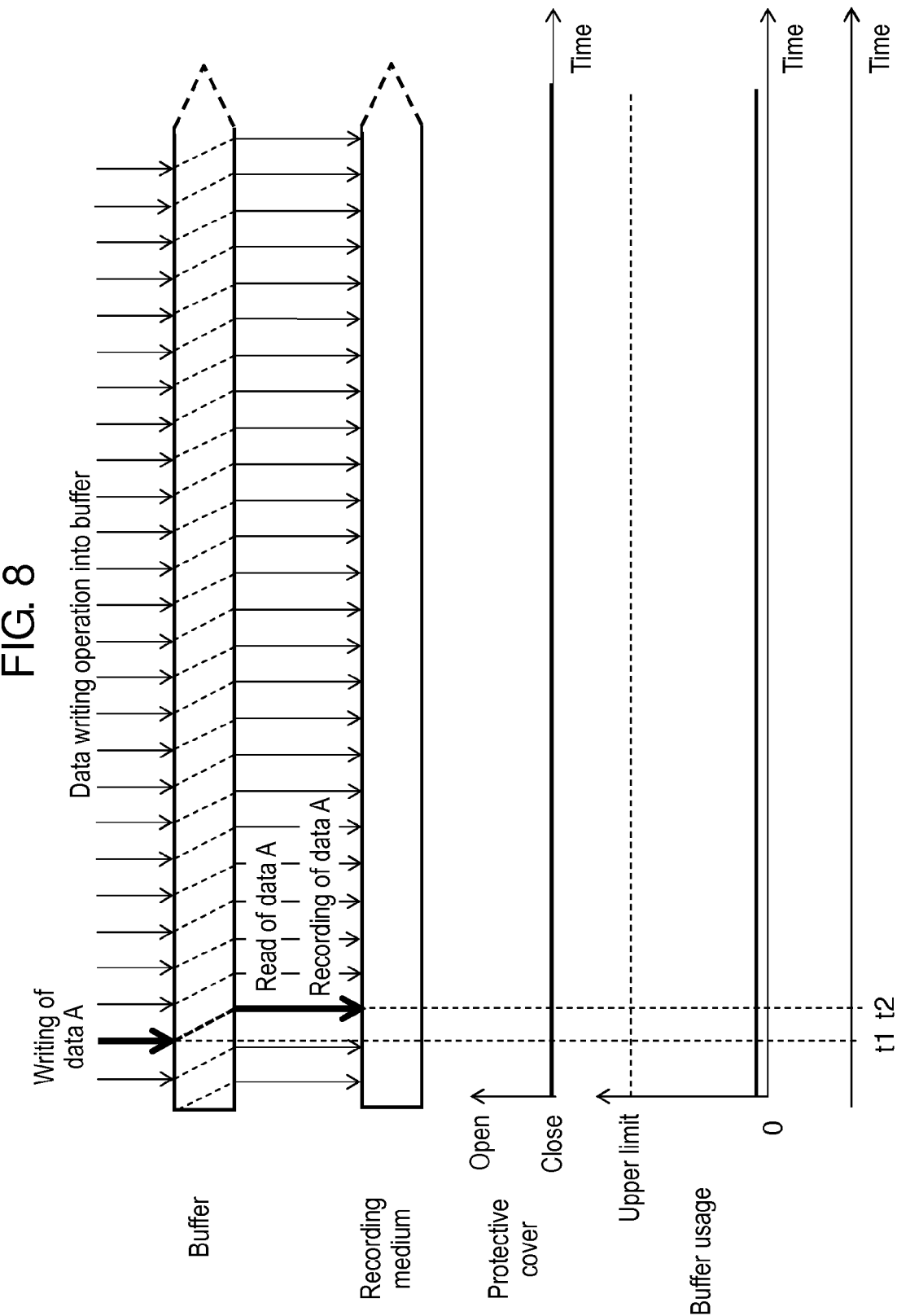
FIG. 8 is a diagram schematically showing the data recording operation during a normal operation of the recording device in accordance with the first exemplary embodiment.

FIG. 8 is a diagram schematically showing the data recording operation during the normal operation of recording device 100 in accordance with the first exemplary embodiment.

FIG. 8 schematically shows the time variation of the data writing operation and data reading operation on buffer 130, the data recording operation into recording medium 32, the open/closed state of protective cover 12, and the usage of buffer 130 (data amount stored in buffer 130) while the taking of a moving image is performed in imaging apparatus 10.

When the taking of a moving image is performed in imaging apparatus 10, as shown in FIG. 8, data is continuously output from encoder 120, and the data is written into buffer 130 any time.

The data stored in buffer 130 is read from buffer 130 at a rate and data size appropriate for recording into recording medium 32, and is transferred to recording medium 32.

For example, data A written into buffer 130 at time t1 is read from buffer 130 at time t2, and is recorded into recording medium 32. Thus, data A is transferred from buffer 130 to recording medium 32.

The time difference between time t1 and time t2 is about 0.1 sec, for example. However, this time difference varies depending on the operation state of imaging apparatus 10 and the specification of recording medium 32. For example, immediately after the taking of a moving image is started in imaging apparatus 10, the time difference becomes large.

The data read from buffer 130 is erased from buffer 130. Alternatively, new data is written over the read data. Therefore, as shown in FIG. 8, the buffer usage during the normal operation is only slight with reference to a maximum capacity of buffer 130 (upper limit capacity of buffer 130).

The subsequent processes in the flowchart of FIG. 7 are described.

When protective cover 12 is determined to be open in step S12 (Yes), recording controller 141 continues the operation of writing the data output from encoder 120 into buffer 130, and temporarily suspends the data recording operation into recording medium 32 (step S13). Thus, the operation of reading data from buffer 130 is temporarily suspended, and the data amount stored in buffer 130 (usage of buffer 130) increases with time.

Recording controller 141 calculates the period until the usage of buffer 130 arrives at the upper limit (step S14).

The period until the usage of buffer 130 arrives at the upper limit can be obtained by periodically measuring the increment of the data stored in buffer 130 and calculating the increasing rate with recording controller 141, for example. Alternatively, the period can be calculated on the basis of the measured value of the amount of the data output from encoder 120 per unit time (e.g. 1 sec). However, the method of calculating the period until the usage of buffer 130 arrives at the upper limit is not limited to these methods. Any method may be used.

On the basis of the calculation result in step S14, recording controller 141 commands total controller 140 to display a warning image on display unit 150 when the remaining period until the usage of buffer 130 arrives at the upper limit becomes a preset period or less (step S15).

Recording controller 141 continuously monitors the open/closed state of protective cover 12 (step S16).

When it is detected that protective cover 12 is closed in step S16 (Yes), recording controller 141 commands total controller 140 to stop the display of the warning image on display unit 150 (step S17).

Recording controller 141 restarts the data recording operation into recording medium 32 (step S18).

The sequence of step S17 and step S18 may be reversed.

The outlines of the operations in step S13 to step S18 are described with reference to drawings.

Figure 9:
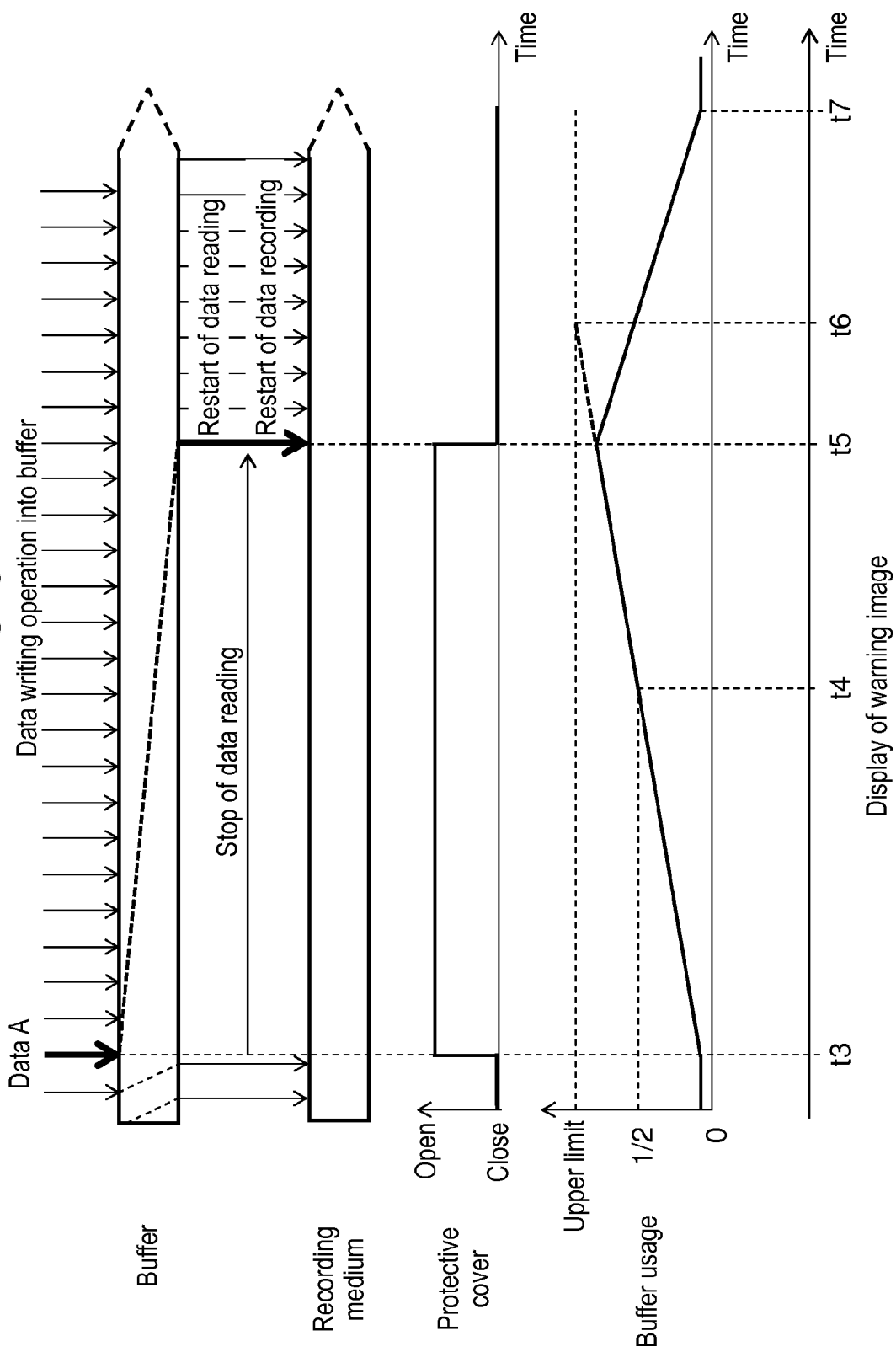
FIG. 9 is a diagram schematically showing one example of the data recording operation of the recording device in accordance with the first exemplary embodiment.

FIG. 9 is a diagram schematically showing one example of the data recording operation of recording device 100 in accordance with the first exemplary embodiment.

FIG. 9 schematically shows the time variation of the data writing operation and data reading operation on buffer 130, the data recording operation into recording medium 32, the open/closed state of protective cover 12, and the usage of buffer 130 (data amount stored in buffer 130) while the taking of a moving image is performed in imaging apparatus 10. FIG. 9 shows the operation in which protective cover 12 of recording device 100 changes from the closed state to the open state and then returns to the closed state before the usage of buffer 130 arrives at the upper limit.

When recording controller 141 detects that protective cover 12 is opened via open/close detecting unit 34, recording controller 141 immediately stops the operation of reading data from buffer 130 and the operation of recording data into recording medium 32. However, the operation of taking a moving image in imaging apparatus 10 is not stopped, and the data output from encoder 120 is continued. Recording controller 141 continues the operation of writing the data output from encoder 120 into buffer 130.

In the example shown in FIG. 9, recording controller 141 detects that protective cover 12 is opened at time t3. Therefore, after time t3, the operation of reading data from buffer 130 and the operation of recording data into recording medium 32 are stopped. However, the operation of writing the data output from encoder 120 into buffer 130 is continued after time t3.

Since the operation of reading data from buffer 130 is stopped, the data output from encoder 120 is continuously stored in buffer 130. Therefore, after time t3, the usage of buffer 130 increases with time.

Recording controller 141, on the basis of the increment or the like of the usage of buffer 130, calculates the period until the usage of buffer 130 arrives at the upper limit, and predicts the arrival time at the upper limit. Then, on the basis of the prediction result, recording controller 141 commands total controller 140 to display a warning image on display unit 150.

In other words, when recording controller 141 detects that protective cover 12 is opened, recording controller 141 issues a command to total controller 140, and displays a warning image on display unit 150 between the detection time of the open state (time t3) and the time at which the usage of buffer 130 arrives at the upper limit.

When the time at which the usage of buffer 130 arrives at the upper limit is calculated to be time t6, recording controller 141 commands total controller 140 to display a warning image on display unit 150 at time t4 existing between time t3 and time t6. Time t4 may be set immediately after time t3, or may be set at a midpoint between time t3 and time t6.

For example, when buffer 130 has a capacity capable of storing the taken data corresponding to about 10 sec period, time t6 is a time after about 10 sec from time t3. When time t4 is set at a midpoint between time t3 and time t6, time t4 is a time after about 5 sec from time t3. In the present exemplary embodiment, however, the capacity of buffer 130 and the time at which a warning image is displayed on display unit 150 are not limited to these numerical values.

When recording controller 141 detects that protective cover 12 is closed at time t5 before the usage of buffer 130 arrives at the upper limit, recording controller 141 immediately restarts the data transfer operation from buffer 130 to recording medium 32. In other words, when protective cover 12 is closed, the operation of reading data from buffer 130 and the operation of recording data into recording medium 32 are immediately restarted.

Thus, data (for example, data after data A) remaining in buffer 130 after time t3 at which protective cover 12 is opened is sequentially read from buffer 130 after time t5 at which protective cover 12 is closed, and is recorded into recording medium 32.

The restart of the data transfer operation gradually decreases the usage of buffer 130, and the buffer usage arrives at a value equivalent to that in the normal operation at time t7.

In order to decrease the usage of buffer 130 after time t5, the transfer rate of data from buffer 130 to recording medium 32 is made higher than that of data from encoder 120 to buffer 130. For example, when the transfer rate of data from buffer 130 to recording medium 32 is made two or more times the transfer rate of data from encoder 120 to buffer 130, the period from time t5 to time t7 can be made equal to or shorter than the period from time t3 to time t5.

When recording controller 141 detects that protective cover 12 is closed, recording controller 141 commands total controller 140 to stop the display of the warning image on display unit 150. At this time, recording controller 141 may command total controller 140 to display, on display unit 150, a message for reporting that protective cover 12 is closed.

Thus, recording device 100 performs the normal operation after time t7.

Thus, in recording device 100 of the present exemplary embodiment, the taken data during the open state of protective cover 12 is stored in buffer 130 until the usage of buffer 130 arrives at the upper limit, and is transferred from buffer 130 to recording medium 32 after protective cover 12 is closed. Thus, when protective cover 12 is opened to expose recording medium 32 to the outside, and hence the risk of occurrence of an unnecessary physical contact or the like with recording media 32 arises, the recording operation into recording medium 32 can be suspended and the taken data can be stored in buffer 130 during the suspension. When protective cover 12 is closed within a period indicated by the warning image, the taken data during the open state of protective cover 12 can be transferred from buffer 130 to recording medium 32 and can be stably recorded in recording medium 32.

Hereinafter, examples of the warning image are described with reference to drawings.

Figure 10:
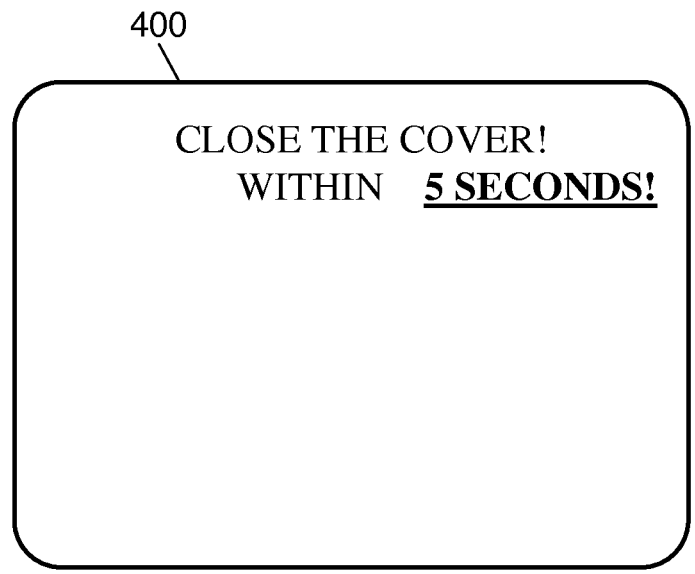
FIG. 10 is a diagram schematically showing one example of a warning image in accordance with the first exemplary embodiment.

FIG. 10 is a diagram schematically showing one example of the warning image in accordance with the first exemplary embodiment.

Figure 11:
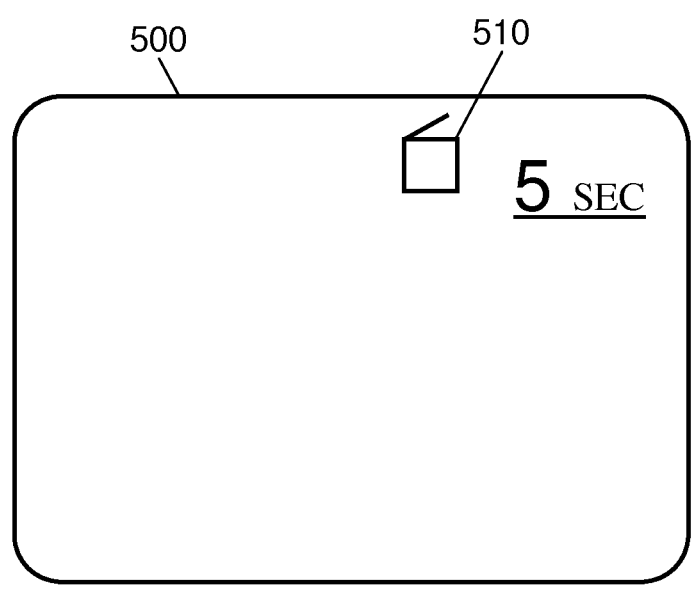
FIG. 11 is a diagram schematically showing another example of the warning image in accordance with the first exemplary embodiment.

FIG. 11 is a diagram schematically showing another example of the warning image in accordance with the first exemplary embodiment.

The warning image is an image for notifying the user of the fact that protective cover 12 is open and must be rapidly closed and of the remaining period until the usage of buffer 130 arrives at the upper limit (remaining period until protective cover 12 is closed).

For example, in the example of FIG. 10, in order to notify the user that protective cover 12 is open and must be rapidly closed, the message "CLOSE THE COVER!" is displayed on warning image 400. In order to notify the user of the remaining period until protective cover 12 is closed, the message "WITHIN 5 SECONDS!" is displayed on warning image 400.

In the example of FIG. 11, in order to notify the user that protective cover 12 is open and must be rapidly closed, icon 510 is displayed on warning image 500. In order to notify the user of the remaining period until protective cover 12 is closed, the message "5 SEC" is displayed on warning image 500.

The numeral "5" shown in FIG. 10 and FIG. 11 is a numerical value that decreases with time (countdown), and its initial value varies depending on the capacity of buffer 130 and the data amount output from encoder 120. To call user's attention, for example, each message may be made to flash, may be changed in color, or may be changed in size. Icon 510 may be displayed as an animation for reminding the user of the open/close operation of protective cover 12.

The warning image is not limited to the examples shown in FIG. 10 and FIG. 11. However, the warning image may have any content as long as it can notify the user of the fact that protective cover 12 is open and must be rapidly closed and of the remaining period until protective cover 12 is closed.

The subsequent processes in the flowchart of FIG. 7 are described.

When protective cover 12 is kept open in step S16 (No), recording controller 141 determines whether the usage of buffer 130 is lower than the upper limit (step S26) or not. Based on the determination in step S26, recording controller 141 continues an operation similar to the above-mentioned one until the usage of buffer 130 arrives at the upper limit (Yes). When recording controller 141 determines that the usage of buffer 130 arrives at the upper limit in step S26 (No), recording controller 141 immediately restarts the data recording operation into recording medium 32 (step S18). At this time, the warning image may be kept to be displayed on display unit 150.

The outlines of these operations are described with reference to a drawing.

Figure 12:
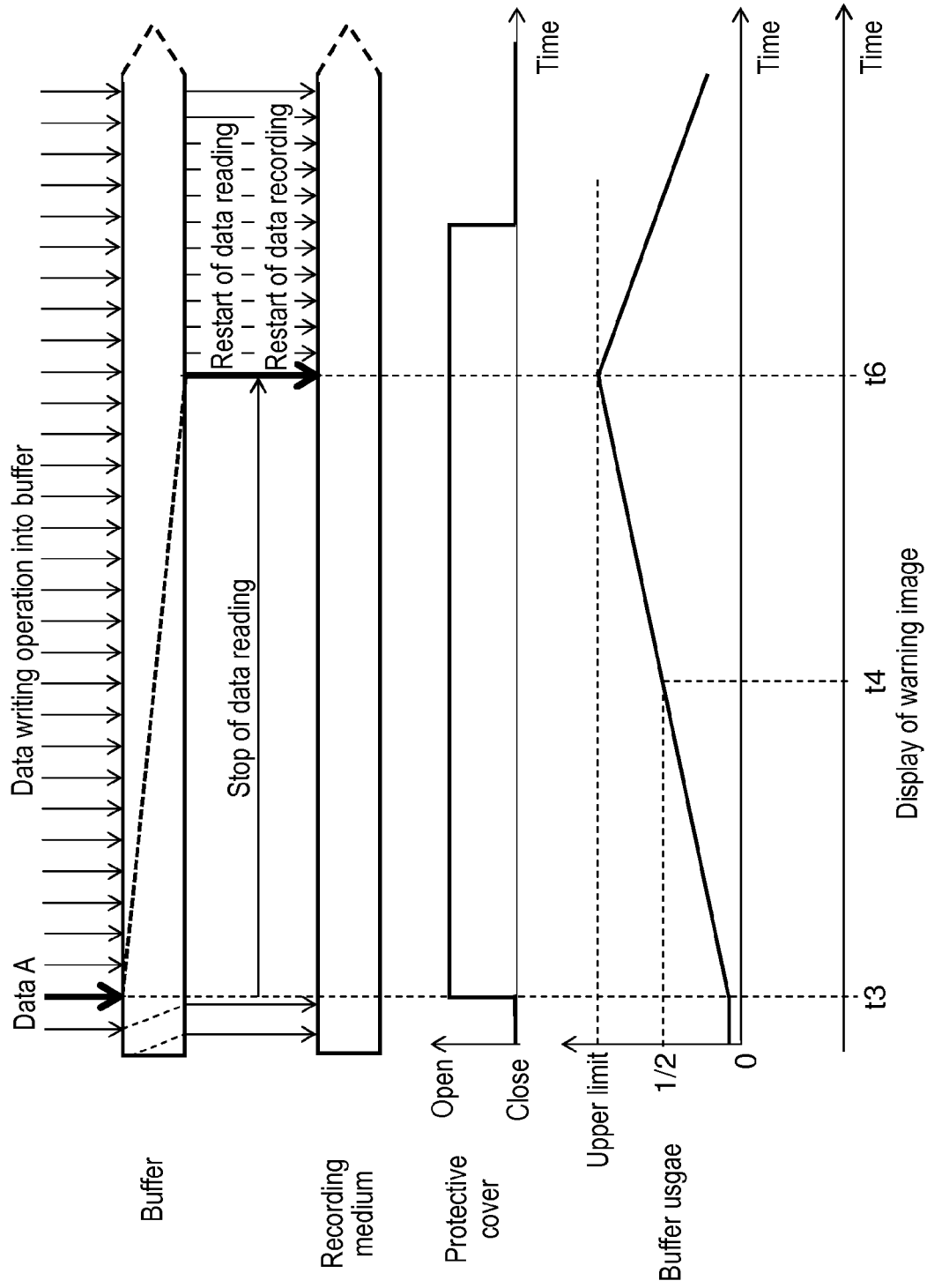
FIG. 12 is a diagram schematically showing another example of the data recording operation of the recording device in accordance with the first exemplary embodiment.

FIG. 12 is a diagram schematically showing another example of the data recording operation of recording device 100 in accordance with the first exemplary embodiment.

FIG. 12 schematically shows the time variation of the data writing operation and data reading operation on buffer 130, the data recording operation into recording medium 32, the open/closed state of protective cover 12, and the usage of buffer 130 (data amount stored in buffer 130) while the taking of a moving image is performed in imaging apparatus 10. FIG. 12 shows the operation in which protective cover 12 of recording device 100 changes from the closed state to the open state, and then the usage of buffer 130 arrives at the upper limit while the open state is kept.

In FIG. 12, the operation of recording device 100 until time t6 at which the usage of buffer 130 arrives at the upper limit is substantially the same as the operation of recording device 100 when protective cover 12 is in the open state (described in FIG. 9), so that the repeated description is omitted.

When the usage of buffer 130 arrives at the upper limit while protective cover 12 is not closed, recording controller 141 recognizes, with interface 36 as a recording medium detecting unit, whether recording medium 32 is mounted on mounting unit 35 or not at the arrival time t6. When recording medium 32 is mounted on mounting unit 35, the data transfer operation from buffer 130 to recording medium 32 is immediately restarted while the warning image is kept to be displayed on display unit 150. In other words, when the usage of buffer 130 arrives at the upper limit, the operation of reading data from buffer 130 and the operation of recording data into recording medium 32 are immediately restarted.

The purpose of such an operation by recording device 100 is to record the taken data in imaging apparatus 10 so as to minimize the loss.

The message displayed on the warning image may be replaced with a message for reporting "protective cover 12 is not closed, but the data recording operation into recording medium 32 is restarted because the usage of buffer 130 arrives at the upper limit".

The operation of recording device 100 after the data transfer from buffer 130 to recording medium 32 is restarted is substantially the same as the operation (described in FIG. 9) of recording device 100 when protective cover 12 changes from the open state to the closed state (operation after time t5), so that the repeated description is omitted.

After the data transfer from buffer 130 to recording medium 32 is restarted, when recording controller 141 detects that protective cover 12 is closed, recording controller 141 commands total controller 140 to stop the display of the warning image on display unit 150. At this time, recording controller 141 may command total controller 140 to display, on display unit 150, a message for reporting that protective cover 12 is closed.

When recording medium 32 is not mounted on mounting unit 35 at time t6, recording controller 141 may command total controller 140 to display, on display unit 150, a message for reporting "the taking of a moving image cannot be continued because recording medium 32 is not mounted on recording device 100" and to stop the taking of a moving image.

Alternatively, when it is detected that recording medium 32 is not mounted on mounting unit 35, recording controller 141 may immediately command total controller 140 to display, on display unit 150, a message for reporting "recording medium 32 must be mounted on recording device 100".

The present exemplary embodiment has described the example where one recording medium 32 is mounted on recording device 100 and the recording medium 32 is protected by one protective cover 12. However, a plurality of recording media may be mounted on the recording device.

Figure 13:
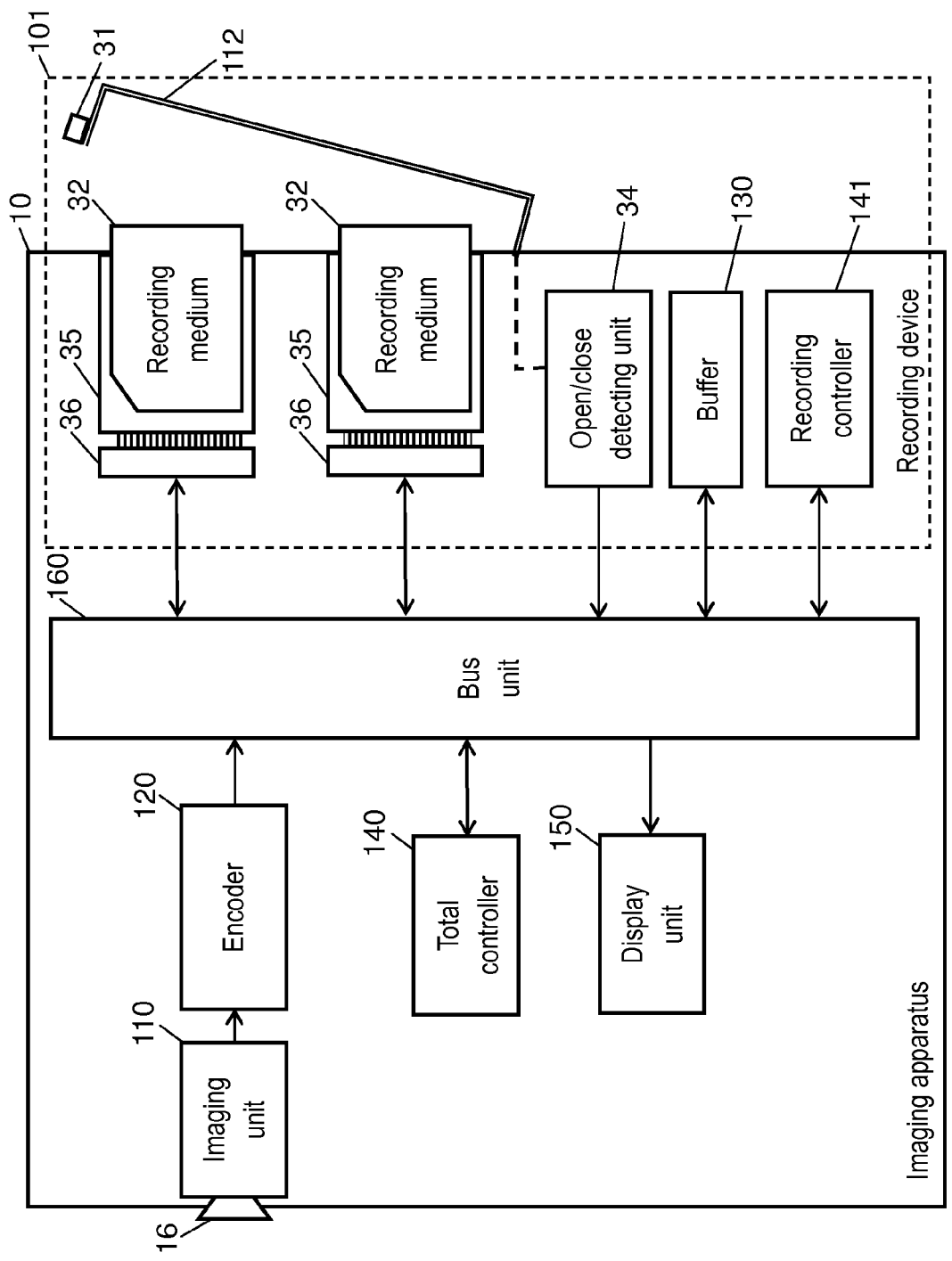
FIG. 13 is a block diagram schematically showing another example of the configuration of the recording device in accordance with the first exemplary embodiment.

FIG. 13 is a block diagram schematically showing another example of the configuration of the recording device in accordance with the first exemplary embodiment. In FIG. 13, blocks that perform substantially the same as those of blocks of recording device 100 shown in FIG. 5 and FIG. 6 are denoted with the same reference marks.

Recording device 101 shown in FIG. 13 differs from recording device 100 shown in FIG. 5 and FIG. 6 in that a plurality of recording media 32 can be mounted on recording device 101. FIG. 13 shows a configuration example where two recording media 32 are protected by one protective cover 112.

However, recording device 101 is similar to recording device 100 in the configuration where the number of protective covers 112 protecting recording media 32 is one. Recording device 101 performs substantially the same operations as those of recording device 100, such as the operation when protective cover 112 changes from the closed state to the open state.

In the recording device of the present exemplary embodiment, the number of recording media protected by the protective cover is not limited to one. The recording device may be configured so that a plurality of recording media are mounted on it.

[1-3. Effect]

Thus, in the present exemplary embodiment, recording device 100 includes mounting unit 35, protective cover 12, open/close detecting unit 34, buffer 130, and recording controller 141. Mounting unit 35 is configured so that recording medium 32 can be detachably mounted on the mounting unit. Protective cover 12 is disposed openably and closably. Protective cover 12 is configured so that, in the closed state, it covers recording medium 32 mounted on mounting unit 35 to shield recording medium 32 from the outside, and, in the open state, recording medium 32 mounted on mounting unit 35 is exposed to the outside. Open/close detecting unit 34 is configured to detect the open/closed state of protective cover 12. Buffer 130 is configured to temporarily store the data to be recorded in recording medium 32 mounted on mounting unit 35. Recording controller 141 is configured to perform a control of storing the data in buffer 130, reading, from buffer 130, the data stored in buffer 130, and recording it into recording medium 32 mounted on mounting unit 35. Recording controller 141 is also configured to, when open/close detecting unit 34 detects that protective cover 12 is opened, perform a control of continuing an operation of storing the data in buffer 130, and yet stopping the operation of reading, from buffer 130, the data stored in buffer 130 and recording it into recording medium 32.

Imaging apparatus 10 includes imaging unit 110, display unit 150, and recording device 100 for recording, in recording medium 32, data based on a video signal taken with imaging unit 110.

Thus, the taken data during the open state of protective cover 12 can be stored in buffer 130 until the buffer usage arrives at the upper limit of buffer 130. Thus, when protective cover 12 is opened to expose recording medium 32 to the outside, and hence the risk of occurrence of an unnecessary physical contact or the like with recording media 32 arises, the recording operation into recording medium 32 can be suspended and the taken data during the suspension can be stably stored in buffer 130. For example, even when protective cover 12 is opened and recording medium 32 is accidentally and temporarily taken out of mounting unit 35, the data taken in imaging apparatus 10 during the taking out can be stored in buffer 130.

In the present exemplary embodiment, recording controller 141 of recording device 100 is configured so that, when open/close detecting unit 34 detects that protective cover 12 is closed before the data stored in buffer 130 arrives at the upper limit of capacity of buffer 130, recording controller 141 restarts the operation of reading, from buffer 130, the data stored in buffer 130 and recording it into recording medium 32 mounted on mounting unit 35.

Thus, after protective cover 12 is closed, the data stored in buffer 130 can be transferred from buffer 130 to recording medium 32. Therefore, the data taken in imaging apparatus 10 while protective cover 12 is open can be stably stored in recording medium 32.

A professional-use video camera or the like is required to certainly record the taken data into the recording medium without loss. However, loss of the taken data occurs due to the following accident, for example:

the protective cover is accidentally opened, a finger or the like of the user unintendedly touches the recording medium to cause chattering, and the recording operation is not correctly performed for a short time; or the recording medium is accidentally and temporarily taken out of the mounting unit during taking a moving image.

In recording device 100 of the present exemplary embodiment, however, when protective cover 12 is opened and the risk that the recording operation into recording medium 32 is not stably performed arises, the recording operation into recording medium 32 is suspended and the taken data during the suspension is continuously stored in buffer 130. When protective cover 12 is closed, the data stored in buffer 130 is immediately transferred to recording medium 32. Thus, even if protective cover 12 is opened and the risk that the recording operation into recording medium 32 becomes unstable arises, the operation of taking a moving image in imaging apparatus 10 can be continued without suspension, loss of the taken data during the continuation can be prevented, and the taken data can be stably recorded in recording medium 32.

Recording controller 141 may have the following configuration:

when the data stored in buffer 130 arrives at the upper limit of capacity of buffer 130 while protective cover 12 is kept open, on the basis of the detection result by interface 36 as a recording medium detecting unit, recording controller 141 restarts the operation of reading, from buffer 130, the data stored in buffer 130 and recording it in recording medium 32 mounted on mounting unit 35.

Thus, even if the usage of buffer 130 arrives at the upper limit while protective cover 12 is kept open, recording controller 141 can recognize that recording medium 32 is mounted on mounting unit 35 and restart the data transfer from buffer 130 to recording medium 32. Thus, even if protective cover 12 is kept open, the operation of taking a moving image in imaging apparatus 10 can be prevented from being suspended.

Recording controller 141 may be configured so that, when open/close detecting unit 34 detects that protective cover 12 is opened, recording controller 141 performs a control of displaying, on display unit 150, a warning image for notifying the user that protective cover 12 is open.

Recording controller 141 may be configured to, when open/close detecting unit 34 detects that protective cover 12 is opened, perform a control of calculating the period until the data stored in buffer 130 arrives at the upper limit of capacity of buffer 130, and displaying, on display unit 150, a warning image for notifying the user of the calculated period.

Thus, recording controller 141 can notify the user of the fact that protective cover 12 is open and of the period until the usage of buffer 130 arrives at the upper limit (remaining period until protective cover 12 is closed).

Second Exemplary Embodiment

The second exemplary embodiment is hereinafter described using FIG. 14 to FIG. 16.

In the first exemplary embodiment, a configuration has been described where an imaging apparatus includes one protective cover and the protective cover protects one or more recording media mounted on a recording device. In the second exemplary embodiment, a configuration is described where a plurality of recording media are mounted on a recording device and a plurality of protective covers protect the plurality of recording media, respectively.

[2-1. Configuration]

Figure 14:
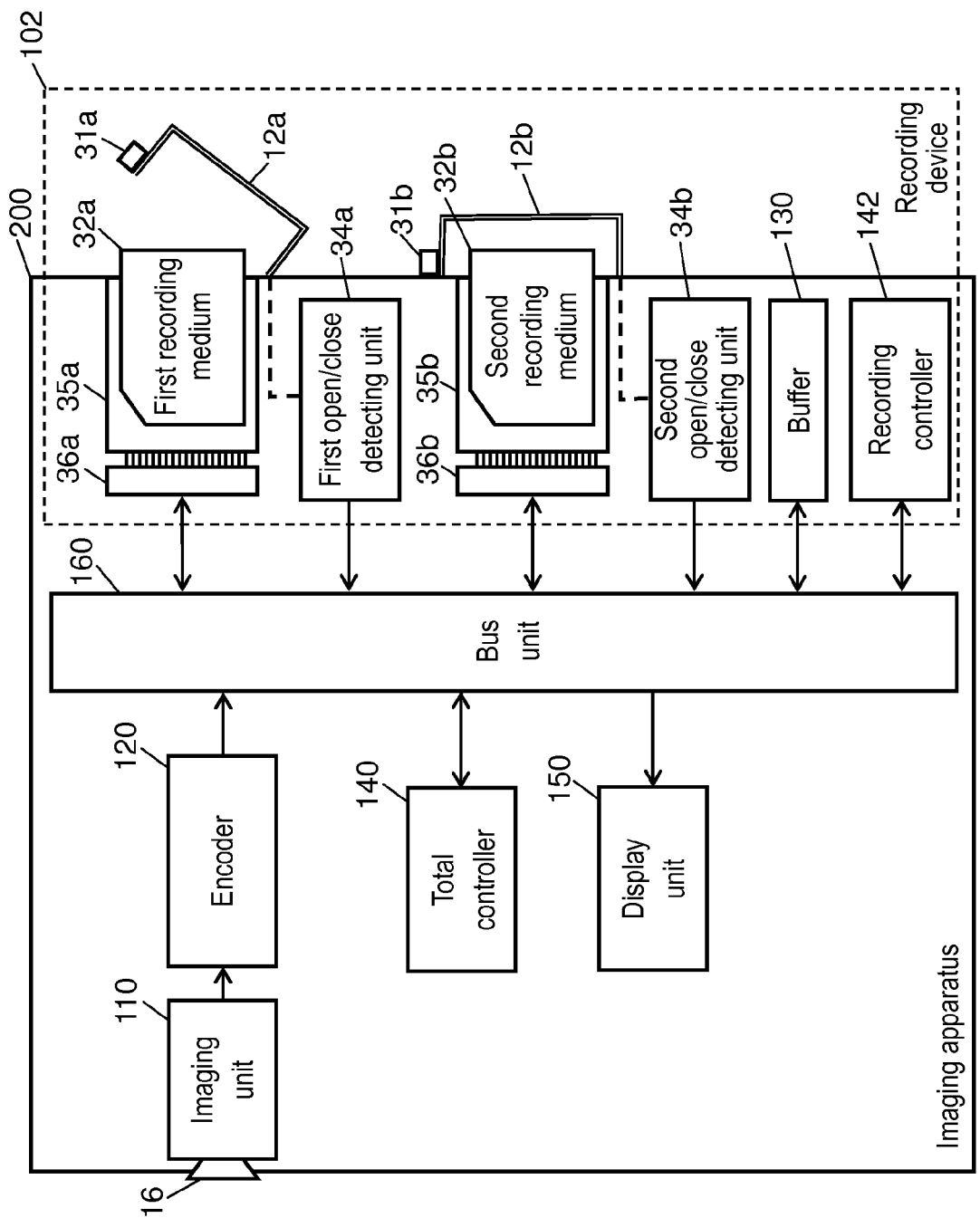
FIG. 14 is a block diagram schematically showing one example of the configuration of the recording device in accordance with a second exemplary embodiment.

The configuration of an imaging apparatus including a recording device of the present exemplary embodiment is described using FIG. 14. In FIG. 14, blocks that perform substantially the same operations as those of the blocks of recording device 100 shown in FIG. 5 and FIG. 6 are denoted with the same reference marks, and the descriptions of those blocks are omitted.

FIG. 14 is a block diagram schematically showing one example of the configuration of imaging apparatus 200 including a recording device in accordance with the second exemplary embodiment.

As shown in FIG. 14, imaging apparatus 200 includes imaging unit 110 having imaging lens unit 16, encoder 120, total controller 140, display unit 150, bus unit 160, and recording device 102. Imaging apparatus 200 of FIG. 14 has substantially the same configuration as that of imaging apparatus 10, and performs substantially the same operation as that of imaging apparatus 10.

Recording device 102 includes first mounting unit 35a, second mounting unit 35b, first interface 36a, second interface 36b, first protective cover 12a, second protective cover 12b, first open/close detecting element 31a, second open/close detecting element 31b, first open/close detecting unit 34a, second open/close detecting unit 34b, buffer 130, and recording controller 142.

In recording device 102 of FIG. 14, first recording medium 32a mounted on first mounting unit 35a is protected by first protective cover 12a, and second recording medium 32b mounted on second mounting unit 35b is protected by second protective cover 12b.

First open/close detecting element 31a is attached on first protective cover 12a, and first open/close detecting element 31a is electrically connected to first open/close detecting unit 34a. Second open/close detecting element 31b is attached on second protective cover 12b, and second open/close detecting element 31b is electrically connected to second open/close detecting unit 34b. The detection result by first open/close detecting unit 34a and the detection result by second open/close detecting unit 34b are input to recording controller 142.

Thus, recording controller 142 that controls blocks of recording device 102 in cooperation with total controller 140 can independently detect the open/closed state of first protective cover 12a and the open/closed state of second protective cover 12b.

First recording medium 32a mounted on first mounting unit 35a is electrically connected to bus unit 160 via first interface 36a, and second recording medium 32b mounted on second mounting unit 35b is electrically connected to bus unit 160 via second interface 36b.

Each of first interface 36a and second interface 36b also serves as a recording medium detecting unit. Recording controller 142 can recognize whether first recording medium 32a is mounted on first mounting unit 35a or not and whether second recording medium 32b is mounted on second mounting unit 35b or not via first interface 36a and second interface 36b, respectively.

The blocks included in recording apparatus 102 are configured to exchange data with each other via bus unit 160.

Thus, recording device 102 of the present exemplary embodiment differs from recording device 100 of the first exemplary embodiment in that recording device 102 includes a plurality of protective covers (for example, first protective cover 12a and second protective cover 12b). However, the function and operation of each of components constituting recording device 102 are substantially the same as those of each of components constituting recording device 100 described in the first exemplary embodiment.

[2-2. Operation]

A data recording operation in recording device 102 having the above-mentioned configuration when a moving image is taken in imaging apparatus 200 is described.

In the present exemplary embodiment, the operation when both first protective cover 12a and second protective cover 12b are in the closed state is substantially the same as the operation (described in the first exemplary embodiment) of recording device 100 when protective cover 12 is in the closed state, so that the description of the operation is omitted.

In the present exemplary embodiment, when the protective cover for protecting the recording medium into which the recording operation is performed is kept closed, even if the protective cover for protecting the recording medium into which the recording operation is not performed changes from the closed state to the open state, the operation at this time is substantially the same as the operation (described in the first exemplary embodiment) of recording device 100 when protective cover 12 is in the closed state. Therefore, the description of this operation is omitted.

In the present exemplary embodiment, the operation when both first protective cover 12a and second protective cover 12b change from the closed state to the open state is substantially the same as the operation (described in the first exemplary embodiment) of recording device 100 when protective cover 12 changes from the closed state to the open state. Therefore, the description of the operation is omitted.

In the present exemplary embodiment, when the protective cover for protecting the recording medium into which the recording operation is not performed is kept closed, and the protective cover for protecting the recording medium into which the recording operation is performed changes from the closed state to the open state, the operation at this time is partially different from the operation of recording device 100 described in the first exemplary embodiment. Hereinafter, the operation at this time is described.

Figure 15:
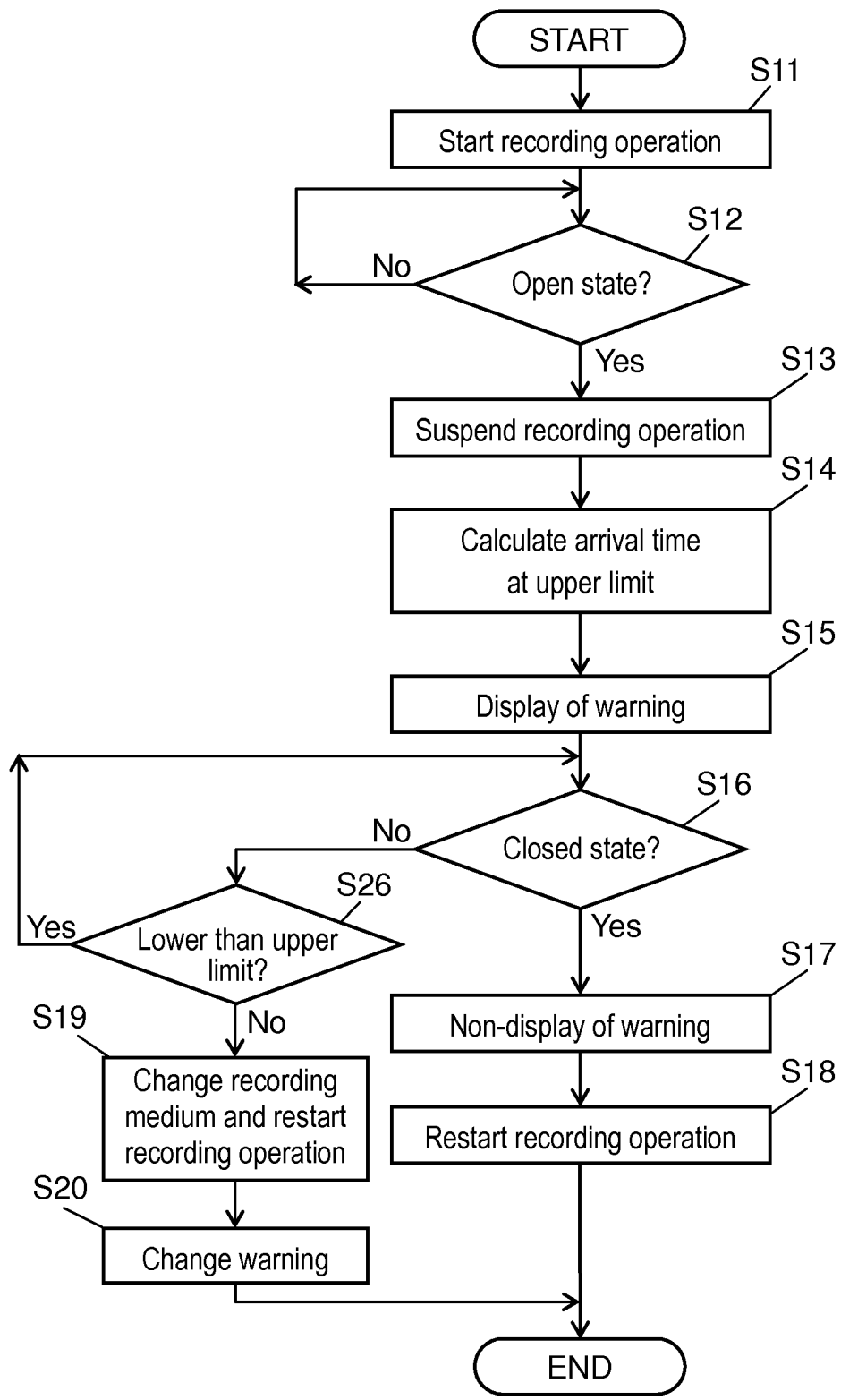
FIG. 15 is a flowchart schematically showing a data recording operation of the recording device in accordance with the second exemplary embodiment.

FIG. 15 is a flowchart schematically showing the data recording operation of recording device 102 in accordance with the second exemplary embodiment.

In the present exemplary embodiment, the operations of recording device 102 shown in FIG. 15 are controlled by recording controller 142.

In the flowchart of FIG. 15, the operations in step S11 to step S18 are substantially the same as the operations in step S11 to step S18 of the flowchart shown in FIG. 7 in the first exemplary embodiment, so that the repeated description is omitted.

In step S12, however, the following states are assumed to be detected by recording controller 142:
 the protective cover (e.g. first protective cover 12a) for protecting the recording medium (e.g. first recording medium 32a) into which the recording operation is performed changes from the closed state to the open state; and
 the protective cover (e.g. second protective cover 12b) for protecting the recording medium (e.g. second recording medium 32b) into which the recording operation is not performed is kept closed.

Also in this case, the operation of recording device 102 until the usage of buffer 130 arrives at the upper limit is substantially the same as the operation (described in the first exemplary embodiment) of recording device 100 when protective cover 12 changes from the closed state to the open state and then is closed, and hence the description is omitted. Here, the operation of recording device 102 means the operation of recording device 102 when it is detected in step S16 (Yes) that the protective cover (e.g. first protective cover 12a) for protecting the recording medium (e.g. first recording medium 32a) into which the recording operation is performed is closed before the usage of buffer 130 arrives at the upper limit.

When the protective cover (e.g. first protective cover 12a) for protecting the recording medium (e.g. first recording medium 32a) into which the recording operation is performed is kept open in step S16 (No), and it is determined by recording controller 142 in step S26 (No) that the usage of buffer 130 arrives at the upper limit, the following operation is performed:
 recording controller 142 immediately changes the recording medium into which the recording operation is performed, and starts the data recording operation into the recording medium (e.g. second recording medium 32b) protected by closed protective cover 12 (e.g. second protective cover 12b) (step S19).

Recording controller 142 commands total controller 140 to display, on display unit 150, instead of the warning image, a message for reporting "first protective cover 12a for protecting first recording medium 32a in which data is recorded is kept open, and the usage of buffer 130 arrives at the upper limit, so that the recording medium in which data is to be recorded is switched to second recording medium 32b and the data recording operation is then restarted" (step S20).

These operations are schematically described with reference to a drawing.

Figure 16:
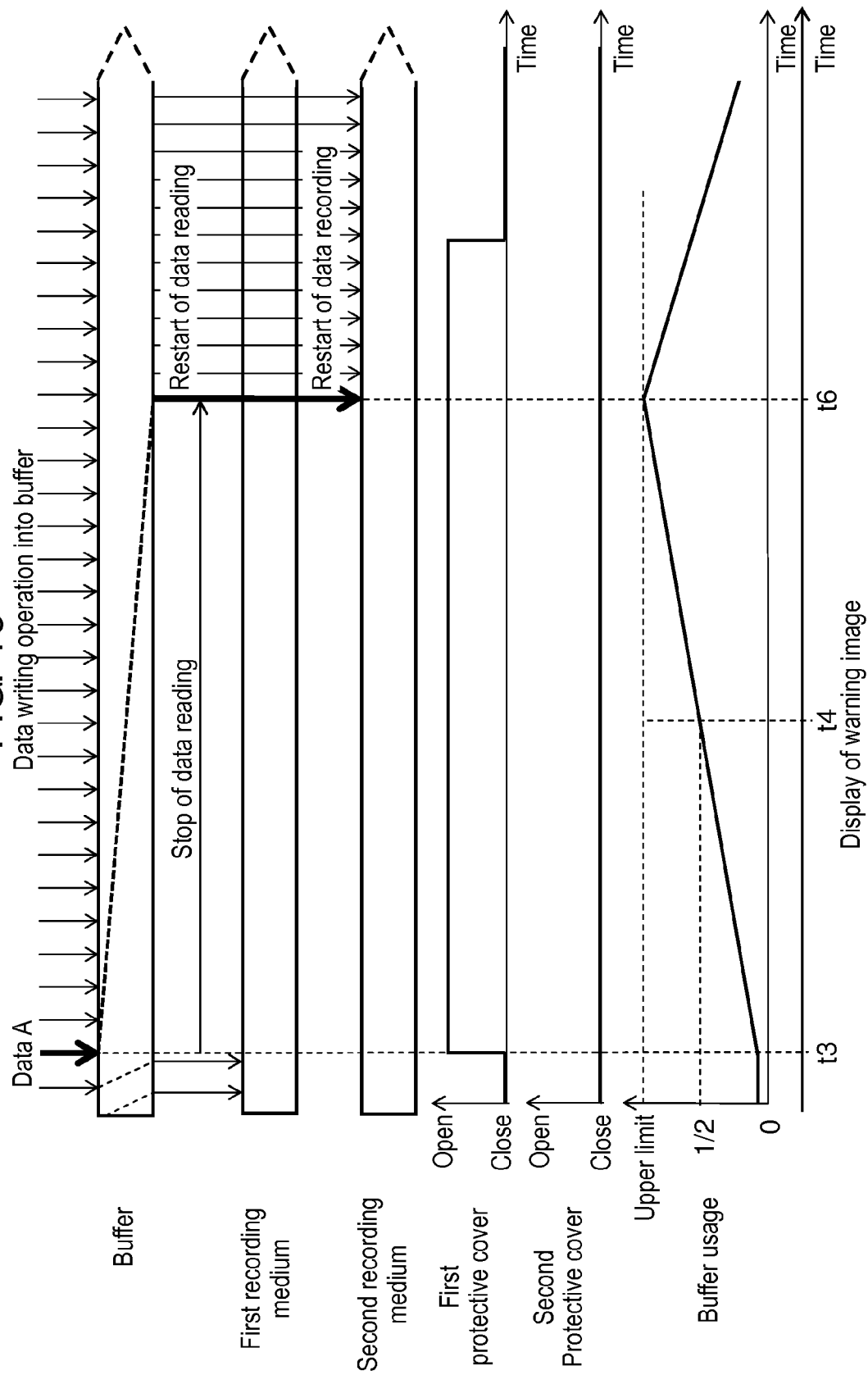
FIG. 16 is a diagram schematically showing one example of the data recording operation of the recording device in accordance with the second exemplary embodiment.

FIG. 16 is a diagram schematically showing one example of the data recording operation of recording device 102 in accordance with the second exemplary embodiment.

FIG. 16 schematically shows the time variation of the data writing operation and data reading operation on buffer 130, the data recording operation into first recording medium 32a and second recording medium 32b, the open/closed state of first protective cover 12a and second protective cover 12b, and the usage of buffer 130 (data amount stored in buffer 130) while the taking of a moving image is performed in imaging apparatus 200. FIG. 16 shows the operation when second protective cover 12b for protecting second recording medium 32b is kept closed, first protective cover 12a for protecting first recording medium 32a changes from the closed state to the open state, and then the usage of buffer 130 arrives at the upper limit while first protective cover 12a is kept open.

In FIG. 16, the operation of recording device 102 until time t6 at which the usage of buffer 130 arrives at the upper limit is substantially the same as the operation (described in FIG. 9) of recording device 100 when protective cover 12 is open, so that the repeated description is omitted.

When the usage of buffer 130 arrives at the upper limit while first protective cover 12a is not closed, recording controller 142 switches the data recording object from first recording medium 32a to second recording medium 32b at time t6 because second protective cover 12b is in the closed state, and immediately starts the data transfer operation from buffer 130 to second recording medium 32b.

Thus, when the usage of buffer 130 arrives at the upper limit, recording controller 142 immediately starts the operation of reading data from buffer 130 and the operation of recording data into recording medium 32 whose protective cover 12 is in the closed state.

The purpose of the operation where data is not recorded into second recording medium 32b before the usage of buffer 130 arrives at the upper limit in recording device 102 is to prevent as much as possible that continuous taken data is recorded separately into two recording media (for example, first recording medium 32a and second recording medium 32b). The reason why, after the usage of buffer 130 arrives at the upper limit, the recording medium is switched from first recording medium 32a to second recording medium 32b and the data recording operation is restarted is as follows:

the recording operation into second recording medium 32b protected by closed second protective cover 12b is performed more stably than that into first recording medium 32a exposed to the outside due to the opening of first protective cover 12a.

Then, recording controller 142 commands total controller 140 to display, on display unit 150, a message for reporting that the recording medium for recording data is switched, instead of the warning image displayed on display unit 150 at time t4.

After the data transfer from buffer 130 to second recording medium 32b is started, the data recording operation into second recording medium 32b is continued even if first protective cover 12a changes from the open state to the closed state. This continuation is also to prevent as much as possible that continuous taken data is recorded separately into a plurality of recording media.

The operation of recording device 102 after the data recording operation into second recording medium 32b is started is substantially the same as the operation of recording device 100 (operation after time t5) described using FIG. 9 when protective cover 12 changes from the open state to the closed state, so that the repeated description is omitted.

The recording device of the present exemplary embodiment may include three or more protective covers and open/close detecting units. Also in that case, an operation similar to the above-mentioned one can be performed.

[2-3. Effect]

Thus, in the present exemplary embodiment, recording device 102 includes a plurality of protective covers. Recording controller 142 is configured so that, when the open/close detecting unit (e.g. first open/close detecting unit 34a) detects that the protective cover (e.g. first protective cover 12a) for protecting the recording medium (e.g. first recording medium 32a) as a data recording object is in the open state, the operation of storing data in buffer 130 is continued, and the operation of reading, from buffer 130, the data stored in buffer 130 and recording the data in the recording medium (e.g. first recording medium 32a) is stopped.

Recording controller 142 may be configured so that, when the open/close detecting unit (e.g. first open/close detecting unit 34a) detects that the protective cover (e.g. first protective cover 12a) for protecting the recording medium (e.g. first recording medium 32a) as a data recording object is closed before the data stored in buffer 130 arrives at the upper limit of capacity of buffer 130, the operation of reading, from buffer 130, the data stored in buffer 130 and recording the data into the recording medium (e.g. first recording medium 32a) as a data recording object is restarted.

Recording controller 142 may be configured so that, when the data stored in buffer 130 arrives at the upper limit of capacity of buffer 130 while the protective cover (e.g. first protective cover 12a) for protecting the recording medium (e.g. first recording medium 32a) as a data recording object is kept open, the data recording object is switched to the recording medium (e.g. second recording medium 32b) covered with the closed protective cover (e.g. second protective cover 12b), the operation of reading, from buffer 130, the data stored in buffer 130 is restarted, and the operation of recording the read data into the recording medium (e.g. second recording medium 32b) covered with the closed protective cover (e.g. second protective cover 12b) is started.

Thus, the data taken in imaging apparatus 200 while the protective cover (e.g. first protective cover 12a) for protecting the recording medium (e.g. first recording medium 32a) as a data recording object is in the open state can be stably recorded in the recording medium (first recording medium 32a or second recording medium 32b).

Since the recording operation into the recording medium (e.g. second recording medium 32b) covered with the closed protective cover (e.g. second protective cover 12b) is not started before the usage of buffer 130 arrives at the upper limit, it can be prevented as much as possible that continuous taken data is recorded separately into a plurality of recording media (e.g. first recording medium 32a and second recording medium 32b).

Another Exemplary Embodiment

Thus, the first and second exemplary embodiments have been described as examples of a technology disclosed in the present disclosure. However, the disclosed technology is not limited to these exemplary embodiments. The disclosed technology can be applied to exemplary embodiments having undergone change, replacement, addition, or omission. A new exemplary embodiment may be created by combining the components described in the first and second exemplary embodiments.

Another exemplary embodiment is described hereinafter. Second recording medium 32b of the second exemplary embodiment has been described as an attachable/detachable interchangeable recording medium. However, second recording medium 32b may be a nonvolatile recording medium built in recording device 102 (for example, a flash memory or hard disk drive (HDD) built in recording device 102). Second recording medium 32b may be a volatile recording medium In the second exemplary embodiment, when recording controller 142 detects that the protective cover (e.g. first protective cover 12a) for protecting the recording medium into which data is being recorded changes from the closed state to the open state, recording controller 142 may immediately switch the recording medium for data recording to the recording medium (e.g. second recording medium 32b) whose protective cover 12 is closed.

In the first and second exemplary embodiments, a configuration where a warning image is displayed on a display unit has been described. However, a voice or a warning sound for notifying the user of the warning contents may be issued from a speaker, for example. Alternatively, flashing of a light emitting element such as a light emitting diode (LED) may notify the user that the protective cover is opened. Furthermore, by gradually shortening the flashing cycle of the light emitting element with decrease in the remaining period until the usage of buffer 130 arrives at the upper limit, the user is encouraged to rapidly close the protective cover.

Representation of "simultaneous" or similar to "simultaneous" used in the descriptions in the first and second exemplary embodiments does not strictly indicate the same time, but includes some time lag corresponding to the time period required for the operation of each block or the time period required for data exchange.

The present disclosure is applicable to a recording device for recording taken data or the like of a moving image into a recording medium, and to an imaging apparatus or the like including the recording device. Specifically, the present disclosure is applicable to a moving image taking apparatus such as a professional-use video camera or consumer video camera, to a still image photographing apparatus such as a digital still camera capable of taking a moving image, and to an audio recording apparatus.

What is claimed is:

1. A recording device comprising: a mounting device configured so that a recording medium is detachably mounted on the mounting device; a protective cover disposed openably and closably, and configured so that, in a closed state, the protective cover covers the recording medium mounted on the mounting device to shield the recording medium from an outside, and, in an open state, the recording medium mounted on the mounting device is exposed to the outside; an open/close detecting device configured to detect an open/closed state of the protective cover; a buffer configured to temporarily store data to be recorded in the recording medium mounted on the mounting device; and a recording controller configured to perform a control of storing the data into the buffer, reading, from the buffer, the data stored in the buffer, and recording the data into the recording medium mounted on the mounting device, and also configured to, when the open/close detecting device detects that the protective cover is opened, perform a control of continuing an operation of storing the data into the buffer, and yet stopping an operation of reading, from the buffer, the data stored in the buffer and recording the data into the recording medium mounted on the mounting device.

2. The recording device of claim 1, wherein the recording controller is configured so that, when the open/close detecting device detects that the protective cover is closed before data stored in the buffer arrives at an upper limit of capacity of the buffer, the recording controller restarts the operation of reading, from the buffer, the data stored in the buffer and recording the data into the recording medium mounted on the mounting device.

3. The recording device of claim 1, further comprising a recording medium detecting device configured to detect whether the recording medium is mounted on the mounting device or not, wherein the recording controller is configured so that, when data stored in the buffer arrives at an upper limit of capacity of the buffer while the protective cover is kept open, based on a detection result by the recording medium detecting device, the recording controller restarts an operation of reading, from the buffer, the data stored in the buffer and recording the data in the recording medium mounted on the mounting device.

4. The recording device of claim 1, comprising a plurality of protective covers as the protective cover, wherein the recording controller is configured to, when the open/close detecting device detects that the protective cover for protecting the recording medium as a data recording object is open, continue the operation of storing the data into the buffer, and yet stop an operation of reading, from the buffer, the data stored in the buffer and recording the data in the recording medium mounted on the mounting device.

5. The recording device of claim 4, wherein the recording controller is configured to, when the open/close detecting device detects that the protective cover for protecting the recording medium as a data recording object is closed before data stored in the buffer arrives at an upper limit of capacity of the buffer, restart the operation of reading, from the buffer, the data stored in the buffer and recording the data into the recording medium as the data recording object, and the recording controller is also configured to, when the data stored in the buffer arrives at the upper limit of capacity of the buffer while the protective cover for protecting the recording medium as the data recording object is kept open, switch the data recording object to a recording medium covered with a closed protective cover, restart the operation of reading, from the buffer, the data stored in the buffer, and start an operation of recording the read data in the recording medium covered with the closed protective cover.

6. An imaging apparatus comprising: an imaging device; and a recording device for recording, in a recording medium, data based on a video signal taken with the imaging device, wherein the recording device includes: a mounting device configured so that the recording medium is detachably mounted on the mounting device; a protective cover disposed openably and closably, and configured so that, in a closed state, the protective cover covers the recording medium mounted on the mounting device to shield the recording medium from an outside, and, in an open state, the recording medium mounted on the mounting device is exposed to the outside; an open/close detecting device configured to detect an open/closed state of the protective cover; a buffer configured to temporarily store the data to be recorded in the recording medium mounted on the mounting device; and a recording controller configured to perform a control of storing the data into the buffer, reading, from the buffer, the data stored in the buffer, and recording the data into the recording medium mounted on the mounting device, and also configured to, when the open/close detecting device detects that the protective cover is opened, perform a control of continuing an operation of storing the data into the buffer, and yet stopping an operation of reading, from the buffer, the data stored in the buffer and recording the data into the recording medium mounted on the mounting device.

7. The imaging apparatus of claim 6, wherein the recording controller is configured so that, when the open/close detecting device detects that the protective cover is closed before data stored in the buffer arrives at an upper limit of capacity of the buffer, the recording controller restarts the operation of reading, from the buffer, the data stored in the buffer and recording the data into the recording medium mounted on the mounting device.

8. The imaging apparatus of claim 6, wherein the recording controller is configured to, when the open/close detecting device detects that the protective cover is opened, perform a control of notifying a user that the protective cover is open.

9. The imaging apparatus of claim 8, further comprising a display device, wherein the recording controller is configured to perform a control of displaying, on the display device, a warning image for notifying a user that the protective cover is open.

10. The imaging apparatus of claim 6, wherein the recording controller is configured to, when the open/close detecting device detects that the protective cover is opened, perform a control of calculating a period until data stored in the buffer arrives at an upper limit of capacity of the buffer, and notifying a user of the calculated period.

11. The imaging apparatus of claim 10, further comprising a display device, wherein the recording controller is configured to perform a control of displaying, on the display device, a warning image for notifying a user of the calculated period.

\* \* \* \* \*